United States Patent
Miura et al.

(10) Patent No.: US 9,352,226 B2
(45) Date of Patent: *May 31, 2016

(54) AUTOMATIC GENERATION OF SUGGESTED MINI-GAMES FOR CLOUD-GAMING BASED ON RECORDED GAMEPLAY

(71) Applicant: Sony Computer Entertainment America LLC, San Mateo, CA (US)

(72) Inventors: Victor Octav Suba Miura, Foster City, CA (US); David Perry, Monarch Beach, CA (US); Philippe Dias, Mission Viejo, CA (US); Kelvin Yong, Irvine, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 13/831,178

(22) Filed: Mar. 14, 2013

(65) Prior Publication Data

US 2014/0179439 A1 Jun. 26, 2014

Related U.S. Application Data

(60) Provisional application No. 61/745,281, filed on Dec. 21, 2012.

(51) Int. Cl.
| | | |
|---|---|---|
| A63F 9/24 | (2006.01) | |
| A63F 13/00 | (2014.01) | |
| G06F 17/00 | (2006.01) | |

(Continued)

(52) U.S. Cl.
CPC .................. *A63F 13/12* (2013.01); *A63F 13/73* (2014.09); *A63F 13/87* (2014.09); *A63F 13/355* (2014.09)

(58) Field of Classification Search
CPC ....... A63F 13/49; A63F 13/497; A63F 13/493
USPC ....................................................... 463/42, 43
See application file for complete search history.

(56) References Cited

U.S. PATENT DOCUMENTS

| 5,269,687 A | 12/1993 | Mott et al. |
| 5,354,202 A | 10/1994 | Moncrief et al. |

(Continued)

FOREIGN PATENT DOCUMENTS

| CN | 103310098 | 9/2013 |
| CN | 103336883 | 10/2013 |

(Continued)

OTHER PUBLICATIONS

PCT Notification of Transmittal of the International Search Report and the Written Opinion of the International Searching Authority from International Application No. PCT/US2013/077320, mailed Jul. 14, 2014 (11 total pages).

(Continued)

*Primary Examiner* — Milap Shah
*Assistant Examiner* — Jason Pinheiro
(74) *Attorney, Agent, or Firm* — Martine Penilla Group, LLP

(57) ABSTRACT

A method for generating a playable limited version of a video game is provided. A user's gameplay of a full version of the video game is recorded. The user's recorded gameplay is analyzed to determine a region of interest. Boundaries are defined within a gameplay context of the video game based on the determined region of interest. The limited version of the video game is generated based on the defined boundaries.

21 Claims, 22 Drawing Sheets

(51) Int. Cl.
  *G06F 19/00* (2011.01)
  *A63F 13/30* (2014.01)
  *A63F 13/87* (2014.01)
  *A63F 13/73* (2014.01)
  *A63F 13/355* (2014.01)

(56) References Cited

U.S. PATENT DOCUMENTS

| | | |
|---|---|---|
| 6,488,505 B1 | 12/2002 | Hightower |
| 6,699,127 B1 * | 3/2004 | Lobb et al. ............... 463/43 |
| 8,043,156 B2 | 10/2011 | Ackley et al. |
| 8,069,125 B2 | 11/2011 | Jung et al. |
| 8,221,220 B2 | 7/2012 | Ackley et al. |
| 8,475,269 B2 | 7/2013 | Okada |
| 8,672,744 B1 | 3/2014 | Gronkowski et al. |
| 8,672,765 B2 | 3/2014 | Gary |
| 8,843,557 B2 | 9/2014 | Ranade |
| 2002/0019258 A1 | 2/2002 | Kim et al. |
| 2004/0148221 A1 | 7/2004 | Chu |
| 2004/0224740 A1 | 11/2004 | Ball et al. |
| 2004/0224741 A1 | 11/2004 | Jen et al. |
| 2004/0225386 A1 | 11/2004 | Thompson et al. |
| 2005/0277455 A1 | 12/2005 | Chudley et al. |
| 2006/0038890 A1 | 2/2006 | Macintosh et al. |
| 2006/0135236 A1 | 6/2006 | Sato et al. |
| 2006/0287029 A1 | 12/2006 | Yoshinobu et al. |
| 2007/0060359 A1 | 3/2007 | Smith |
| 2007/0078989 A1 | 4/2007 | van Datta et al. |
| 2007/0117635 A1 | 5/2007 | Spanton et al. |
| 2007/0294089 A1 | 12/2007 | Garbow et al. |
| 2008/0004115 A1 | 1/2008 | Chatani |
| 2008/0039203 A1 | 2/2008 | Ackley et al. |
| 2008/0039204 A1 | 2/2008 | Ackley et al. |
| 2008/0076546 A1 | 3/2008 | Moyle et al. |
| 2008/0139301 A1 | 6/2008 | Holthe |
| 2008/0167122 A1 | 7/2008 | Maeda et al. |
| 2008/0193099 A1 | 8/2008 | Nakai et al. |
| 2009/0005141 A1 | 1/2009 | Lehtiniemi et al. |
| 2009/0036220 A1 | 2/2009 | Nagashima |
| 2009/0089830 A1 | 4/2009 | Chandratillake et al. |
| 2009/0165140 A1 | 6/2009 | Robinson et al. |
| 2009/0235150 A1 | 9/2009 | Berry |
| 2010/0160038 A1 | 6/2010 | Youm et al. |
| 2010/0203933 A1 | 8/2010 | Eyzaguirre et al. |
| 2010/0235329 A1 | 9/2010 | Koren et al. |
| 2010/0240459 A1 | 9/2010 | Shelton |
| 2010/0292011 A1 | 11/2010 | Kira et al. |
| 2011/0041153 A1 | 2/2011 | Simon et al. |
| 2011/0098108 A1 | 4/2011 | Kuper et al. |
| 2011/0250971 A1 | 10/2011 | van Os et al. |
| 2011/0269548 A1 | 11/2011 | Barclay et al. |
| 2012/0134651 A1 * | 5/2012 | Cottrell ............... 386/278 |
| 2012/0185066 A1 | 7/2012 | Kern et al. |
| 2012/0270647 A1 * | 10/2012 | Zalewski ............... 463/29 |
| 2012/0283011 A1 | 11/2012 | Van Luchene |
| 2012/0295718 A1 | 11/2012 | Paquet et al. |
| 2012/0302351 A1 | 11/2012 | Murphy et al. |
| 2012/0323898 A1 | 12/2012 | Kumar et al. |
| 2013/0040730 A1 | 2/2013 | Barclay et al. |
| 2013/0084969 A1 | 4/2013 | Knoles et al. |
| 2013/0176481 A1 | 7/2013 | Holmes et al. |
| 2013/0190096 A1 | 7/2013 | Ronen et al. |
| 2013/0244785 A1 | 9/2013 | Gary |
| 2013/0244789 A1 | 9/2013 | Gary |
| 2013/0244790 A1 | 9/2013 | Gary |
| 2013/0260896 A1 | 10/2013 | Miura et al. |
| 2014/0038721 A1 | 2/2014 | Archer et al. |
| 2014/0066177 A1 | 3/2014 | Zalewski |
| 2014/0066191 A1 | 3/2014 | Yang |
| 2014/0094314 A1 | 4/2014 | Watson et al. |
| 2014/0187323 A1 | 7/2014 | Perry |
| 2014/0229866 A1 | 8/2014 | Gottlieb |

FOREIGN PATENT DOCUMENTS

| | | |
|---|---|---|
| CN | 103366083 | 10/2013 |
| EP | 2278552 A1 | 1/2011 |
| KR | 20130105469 | 9/2013 |
| KR | 20130105471 | 9/2013 |
| KR | 20130105470 | 9/2014 |
| TW | 201402183 | 1/2014 |
| TW | 201404443 | 2/2014 |
| TW | 201406431 | 2/2014 |
| WO | 2013138163 | 9/2013 |
| WO | 2013138165 | 9/2013 |
| WO | 2013138166 | 9/2013 |

OTHER PUBLICATIONS

PCT International Search Report and Written Opinion for PCT Application No. PCT/US13/29719 dated May 13, 2013.
PCT International Search Report and Written Opinion in Application No. PCT/US2013/029704, mailed on on Mar. 29, 2013.
PCT International Search Report and Written Opinion in Application No. PCT/US2013/029727, mailed on Mar. 29, 2013, 5 pages.
Gamasutra, "Hard Drivin', Hard Barganinin': Investigating Midway's Ghost Racer' Patent", http://www.gamasutra.com/view/feature/129914/hard_drivin_hard_bargainin_.php, Feb. 27, 2015, 3 pages.
Notification Concerning Transmittal of International Preliminary Report on Patentability and Written Opinion in Application No. PCT/US2013/077320, mailed Jul. 2, 2015 (8 total pages).

* cited by examiner

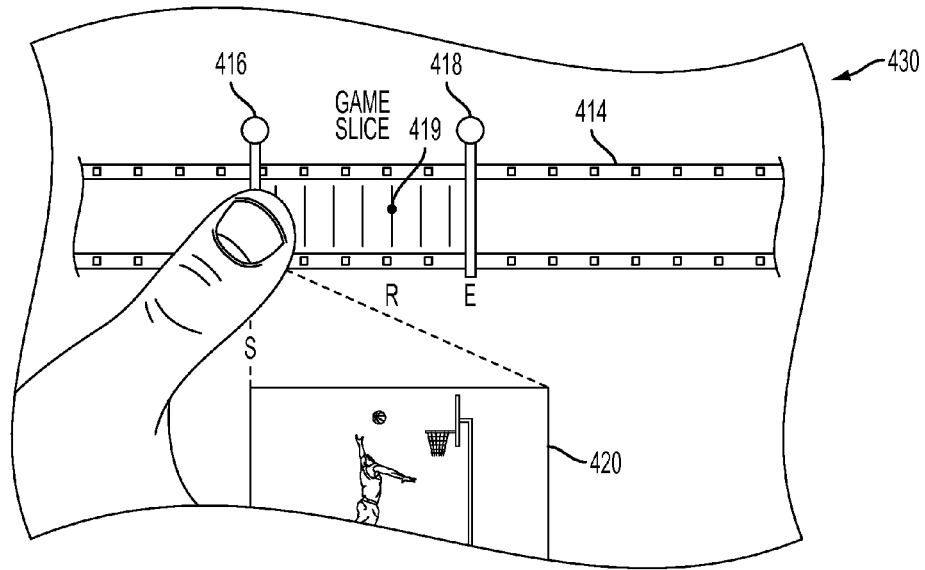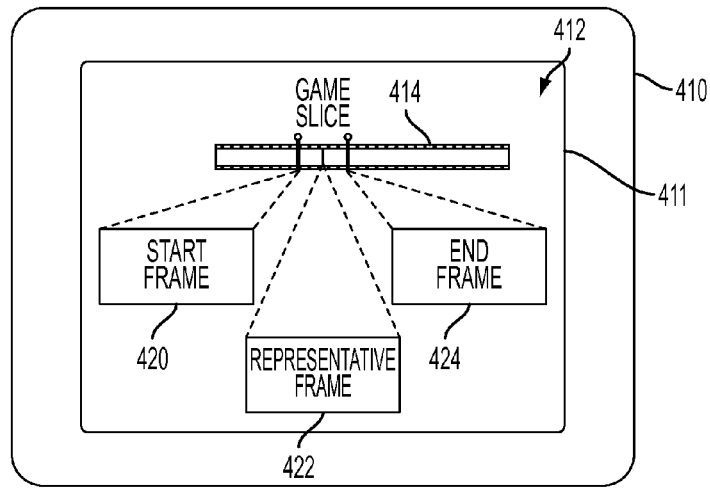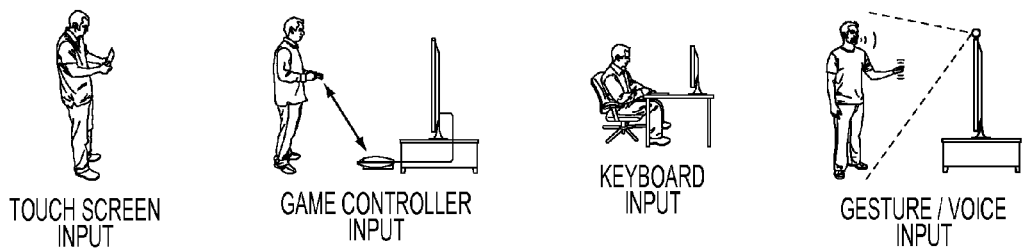
FIG. 4B

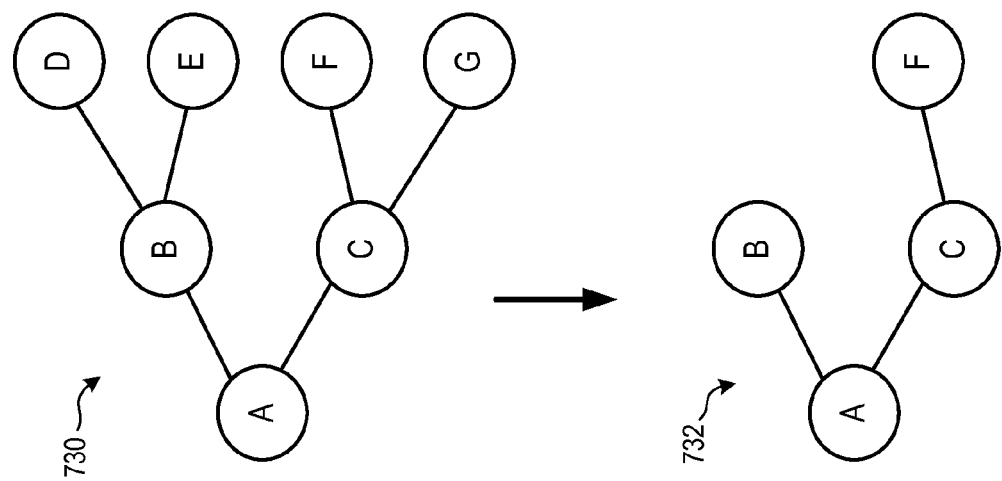
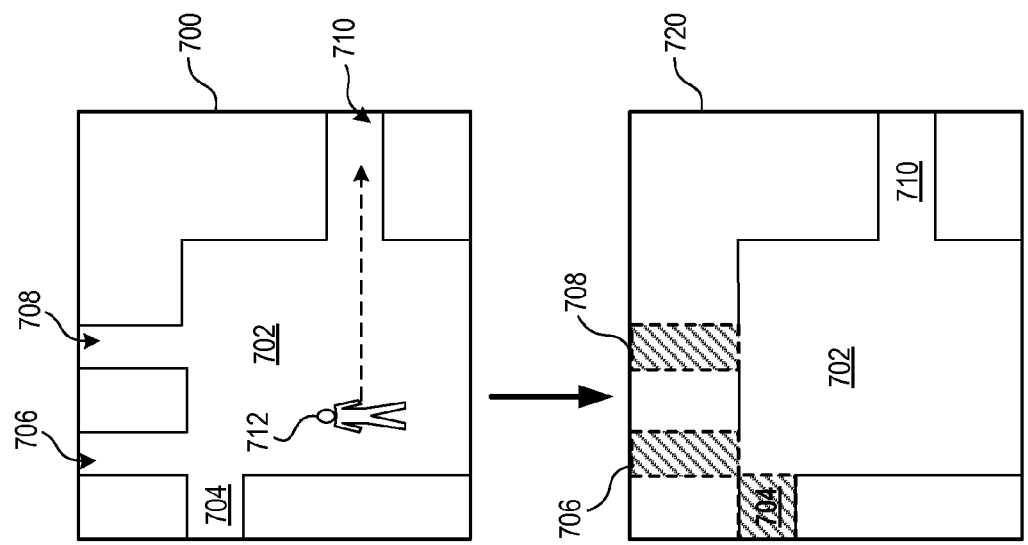
FIG. 7B
FIG. 7A

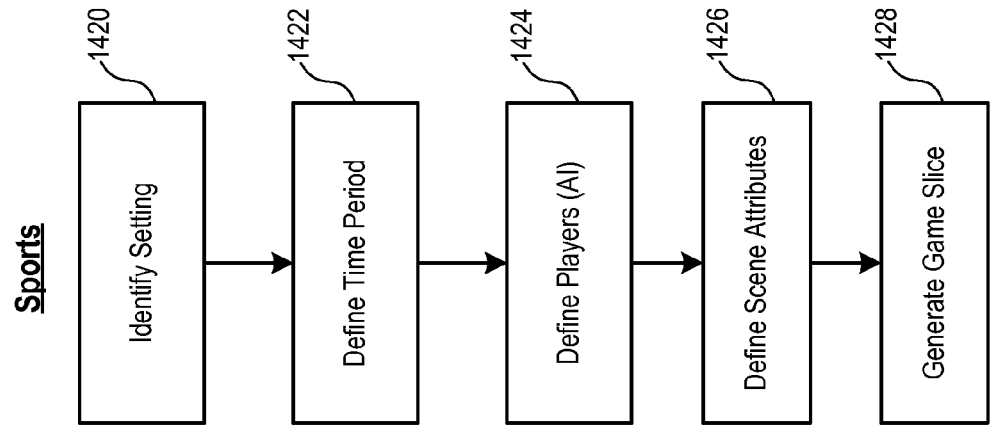
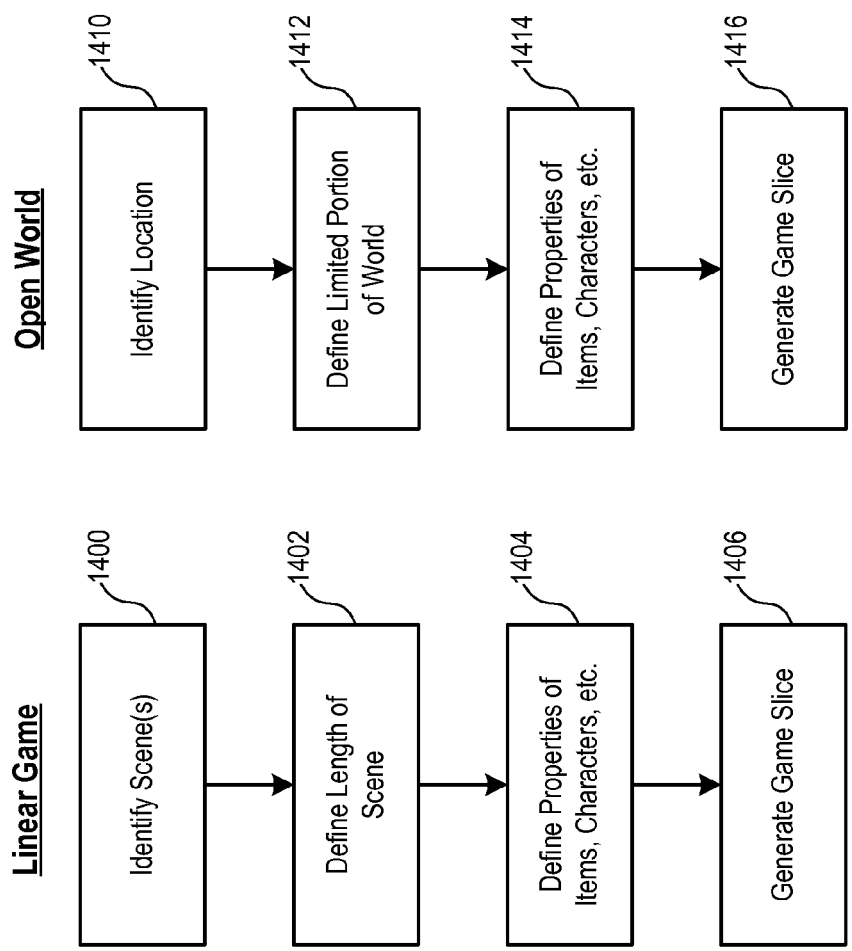

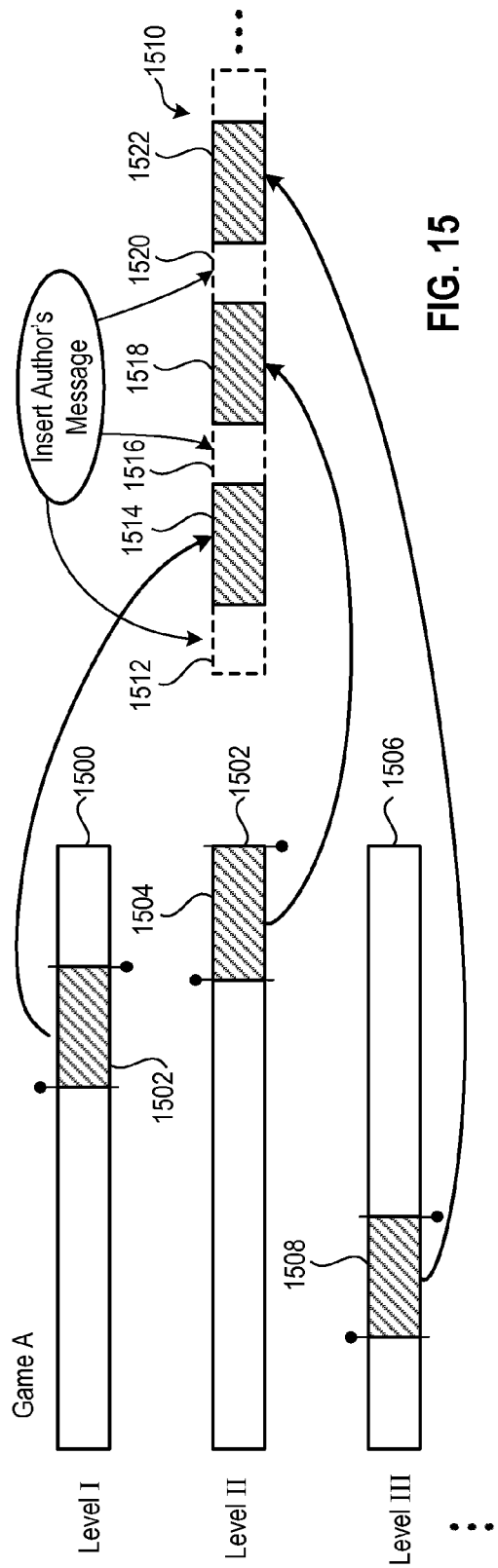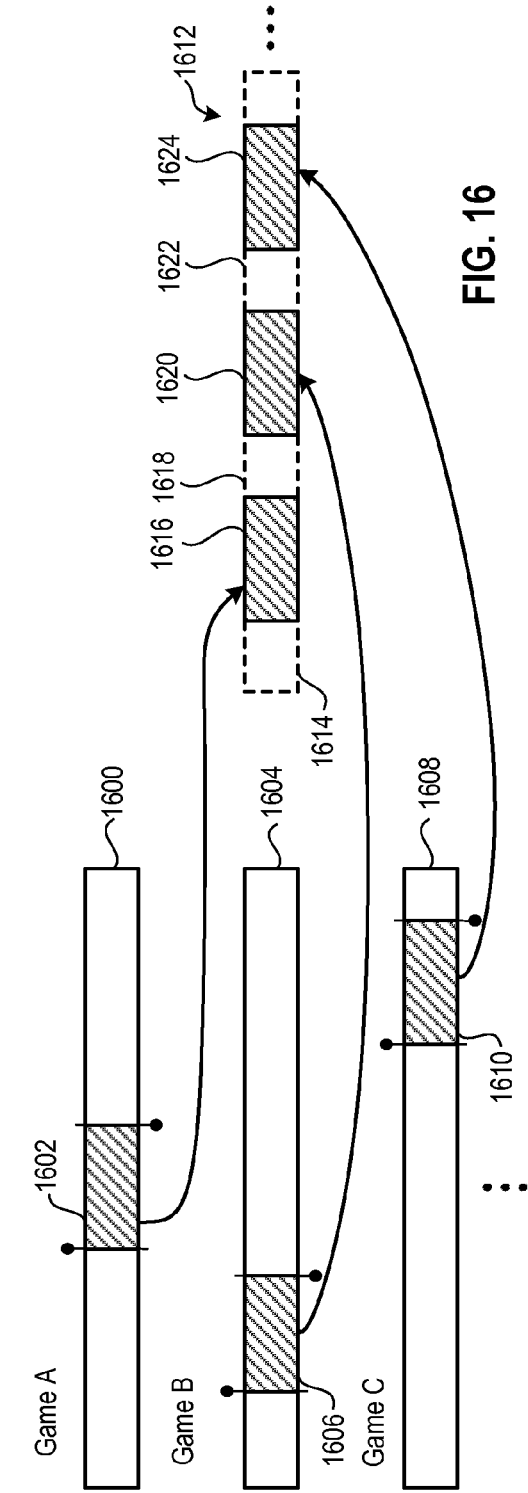

AUTOMATIC GENERATION OF SUGGESTED MINI-GAMES FOR CLOUD-GAMING BASED ON RECORDED GAMEPLAY

CLAIM OF PRIORITY

This application claims priority to U.S. Provisional Application No. 61/745,281, filed Dec. 21, 2012, entitled "Automatic Generation of Suggested Mini-Games for Cloud-Gaming Based on Recorded Gameplay," the disclosure of which is incorporated by reference herein.

RELATED APPLICATIONS

This application is related to U.S. application Ser. No. 13/779,730, filed Feb. 27, 2013, entitled "Systems and Methods for Tagging Content of Shared Cloud Executed Mini-games and Tag Sharing Controls."

This application is related to U.S. application Ser. No. 13/779,735, filed Feb. 27, 2013, entitled "Systems and Methods for Ranking of Cloud Executed Mini-games Based on Tag Content and Social Network Content."

This application is related to U.S. application Ser. No. 13/779,737, filed Feb. 27, 2013, entitled "Systems and Methods for Enabling Shadow Play for Video Games Based on Prior User Plays."

This application is related to U.S. Provisional Application No. 61/746,478, filed Dec. 27, 2012, entitled "Systems and Methods for Sharing Cloud-Executed Mini-Games, Challenging Friends and Enabling Crowd Source Rating."

This application is related to U.S. Provisional Application No. 61/745,543, filed Dec. 21, 2012, entitled "Cloud-Based Game Slice Generation and Frictionless Social Sharing with Instant Play."

This application is related to U.S. application Ser. No. 13/418,691, filed Mar. 13, 2012, entitled "System and Method for Capturing and Sharing Console Gaming Data."

This application is related to U.S. application Ser. No. 13/418,703, filed Mar. 13, 2012, entitled "System and Method for Capturing and Sharing Console Gaming Data."

This application is related to U.S. application Ser. No. 13/418,720, filed Mar. 13, 2012, entitled "System and Method for Capturing and Sharing Console Gaming Data."

The disclosures of these applications are incorporated by reference herein in their entirety for all purposes.

BACKGROUND

1. Field of the Invention

The present invention relates to methods and systems for automatic generation of suggested mini-games based on recorded gameplay.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce a very realistic game experience.

Example gaming platforms, may be the Sony Playstation®, Sony Playstation2® (PS2), and Sony Playstation3® (PS3), each of which is sold in the form of a game console. As is well known, the game console is designed to connect to a monitor (usually a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console is further designed with an optical disc tray for receiving game compact discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another growing trend in the industry involves the development of cloud-based gaming systems. Such systems may include a remote processing server that executes a game application, and communicates with a local thin client that can be configured to receive input from users and render video on a display.

It is in this context that embodiments of the invention arise.

SUMMARY

Embodiments of the present invention provide methods and systems for automatic generation of suggested mini-games to create based on recorded gameplay of a video game. It should be appreciated that the present invention can be implemented in numerous ways, such as a process, an apparatus, a system, a device or a method on a computer readable medium. Several inventive embodiments of the present invention are described below.

In one embodiment, a method for generating a playable limited version of a video game is provided, including the following method operations: recording a user's gameplay of a full version of the video game; analyzing the user's recorded gameplay to determine a region of interest; defining boundaries within a gameplay context of the video game based on the determined region of interest; and generating the limited version of the video game based on the defined boundaries; wherein the method is executed by a processor.

In one embodiment, recording the user's gameplay includes recording one or more of user input data or game state data. In one embodiment, analyzing the user's recorded gameplay includes determining levels of activity of the user input data or game state data, the region of interest being a region having levels of activity that exceed a predefined threshold.

In one embodiment, defining boundaries within a gameplay context of the video game includes defining a spatial boundary within a virtual space of the video game. In one embodiment, the spatial boundary within the virtual space of the video game defines a portion of the virtual space less than an entirety of the virtual space, the portion of the virtual space having a subset of features of the virtual space.

In one embodiment, defining boundaries within a gameplay context of the video game includes defining a temporal boundary within a temporal context of the video game.

In one embodiment, defining boundaries includes identifying a nearest start point or a nearest end point of one or more of a stage, level, or scene.

In one embodiment, analyzing the user's recorded gameplay includes determining user game state settings based on the user's recorded gameplay; and generating the limited version of the video game includes defining the limited version of the video game to have initial game state settings based on the determined user game state settings.

In one embodiment, the region of interest is automatically identified based on correspondence to one or more thresholds. In one embodiment, at least one of said thresholds is associated to one or more of user inputs, a rate of user input, a frequency of user input, repeats of a user input, an input pattern, sharing of the gameplay context with other users, posting of comments associated with the gameplay on a social network, or popularity of portions of the video game based on social network sharing levels.

In another embodiment, a method for generating a playable limited version of a video game is provided, including the following method operations: recording a user's gameplay of a full version of the video game; analyzing the user's recorded gameplay to determine one or more regions of interest; presenting each of the regions of interest for selection; receiving a selection input indicating a selected region of interest; for the selected region of interest, defining boundaries within a gameplay context of the video game based on the selected region of interest; and generating the limited version of the video game based on the defined boundaries; wherein the method is executed by a processor.

In one embodiment, recording the user's gameplay includes recording one or more of user input data or game state data. In one embodiment, analyzing the user's recorded gameplay includes determining levels of activity of the user input data or game state data, each region of interest being a region having levels of activity that exceed a predefined threshold.

In one embodiment, analyzing the user's recorded gameplay includes determining user game state settings based on the user's recorded gameplay; and generating the limited version of the video game includes defining the limited version of the video game to have initial game state settings based on the determined user game state settings.

In one embodiment, each region of interest is automatically identified based on correspondence to one or more thresholds.

In another embodiment, a method for generating a playable limited version of a video game is provided, including the following method operations: recording a user's gameplay of a full version of the video game, wherein recording the user's gameplay includes recording one or more of user input data or game state data; analyzing the user's recorded gameplay to determine one or more regions of interest, wherein each region of interest is automatically identified based on correspondence to one or more thresholds; presenting each of the regions of interest for selection; receiving a selection input indicating a selected region of interest; for the selected region of interest, defining boundaries within a gameplay context of the video game based on the selected region of interest; generating the limited version of the video game based on the defined boundaries; wherein the method is executed by a processor.

In one embodiment, defining boundaries within a gameplay context of the video game includes defining a spatial boundary within a virtual space of the video game; the spatial boundary within the virtual space of the video game defines a portion of the virtual space less than an entirety of the virtual space, the portion of the virtual space having a subset of features of the virtual space.

In one embodiment, defining boundaries within a gameplay context of the video game includes defining a temporal boundary within a temporal context of the video game.

In one embodiment, defining boundaries includes identifying a nearest start point or a nearest end point of one or more of a stage, level, or scene.

In one embodiment, at least one of said thresholds is associated to one or more of user inputs, a rate of user input, a frequency of user input, repeats of a user input, an input pattern, sharing of the gameplay context with other users, posting of comments associated with the gameplay on a social network, or popularity of portions of the video game based on social network sharing levels.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings in which:

FIG. 4B illustrates an interface for selecting a portion of a gameplay timeline for generation of a minigame or game slice, in accordance with an embodiment of the invention.

FIG. 7A illustrates modification of a virtual space for purposes of generating a game slice of a video game, in accordance with an embodiment of the invention.

FIG. 7B illustrates modification of a scene graph for purposes of generating a game slice, in accordance with embodiments of the invention.

FIG. 14A illustrates a method for generating a game slice for a linear type videogame, in accordance with an embodiment of the invention.

FIG. 14B illustrates a method of generating a game slice for an open world type videogame, in accordance with an embodiment of the invention.

FIG. 14C illustrates a method for generating a game slice for a sports videogame, in accordance with an embodiment of the invention.

FIG. 15 conceptually illustrates the formation of a multi-game slice game, in accordance with an embodiment of the invention.

FIG. 16 conceptually illustrates the generation of a multi-game slice minigame, in accordance with an embodiment of the invention.

DETAILED DESCRIPTION

The following embodiments describe methods and apparatus for interfacing with an interactive program.

It will be obvious, however, to one skilled in the art, that the present invention may be practiced without some or all of these specific details. In other instances, well known process operations have not been described in detail in order not to unnecessarily obscure the present invention.

Figure 1A:
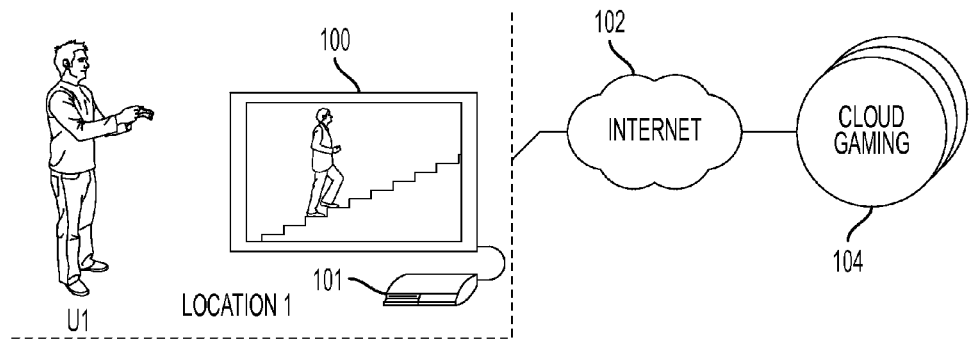
FIG. 1A illustrates a user playing a cloud-based video game, in accordance with embodiments of the invention.

FIG. 1A illustrates a user playing a cloud-based video game, in accordance with embodiments of the invention. As shown, a user U1 plays a cloud-based video game shown on a display 100. A cloud-based video game is a video game that is primarily executed on a remote server. A server, in one embodiment, can include individual servers or servers that are executed in a virtual machine data center, where many servers can be virtualized to provide the requested processing. In the illustrated embodiment, cloud gaming server(s) 104 execute the video game that is rendered on the display 100. A client 101 is situated at the user's location to receive and process inputs and communicate these to the cloud gaming servers 104, and also to receive video and audio data from the cloud gaming servers 104. The client 101 and the cloud gaming servers 104 communicate over a network 102, such as the Internet. In other embodiments, the client can be any device, whether portable or not, whether wireless or not, so long as the client can communicate with a network and provide access to a display for rendering game play and enable input from a user to drive interactivity. In one embodiment, the client is a thin client. However, in other embodiments, the client can be a general purpose computer, a special purpose computer, a gaming console, a personal computer, a laptop computer, a tablet computer, a mobile computing device, a portable gaming device, a cellular phone, a set-top box, a streaming media interface/device, a smart television or networked display, or any other computing device capable of being configured to fulfill the functionality of a client as defined herein. In one embodiment, the cloud gaming server is configured to detect the type of client device which is being utilized by the user, and provide a cloud-gaming experience appropriate to the user's client device. For example, image settings, audio settings and other types of settings may be optimized for the user's client device.

In various embodiments, the degree of processing performed by the client may vary with respect to input and output processing. However, broadly speaking, the video game state is substantially maintained and executed on the cloud gaming servers 104, with the client primarily functioning to receive and communicate user inputs, and receive video/audio data for rendering. The client 101 may be a standalone device that is connected to the display 100 and provides video data for rendering on the display 100. In other embodiments, the client can be integrated into the display 100. In one embodiment, the display 100 is a networked display providing a platform operating system for applications or "apps" utilizing the network connectivity of the display. In such an embodiment, the client can be defined by an application executed on the platform provided by the display's operating system.

Figure 1B:
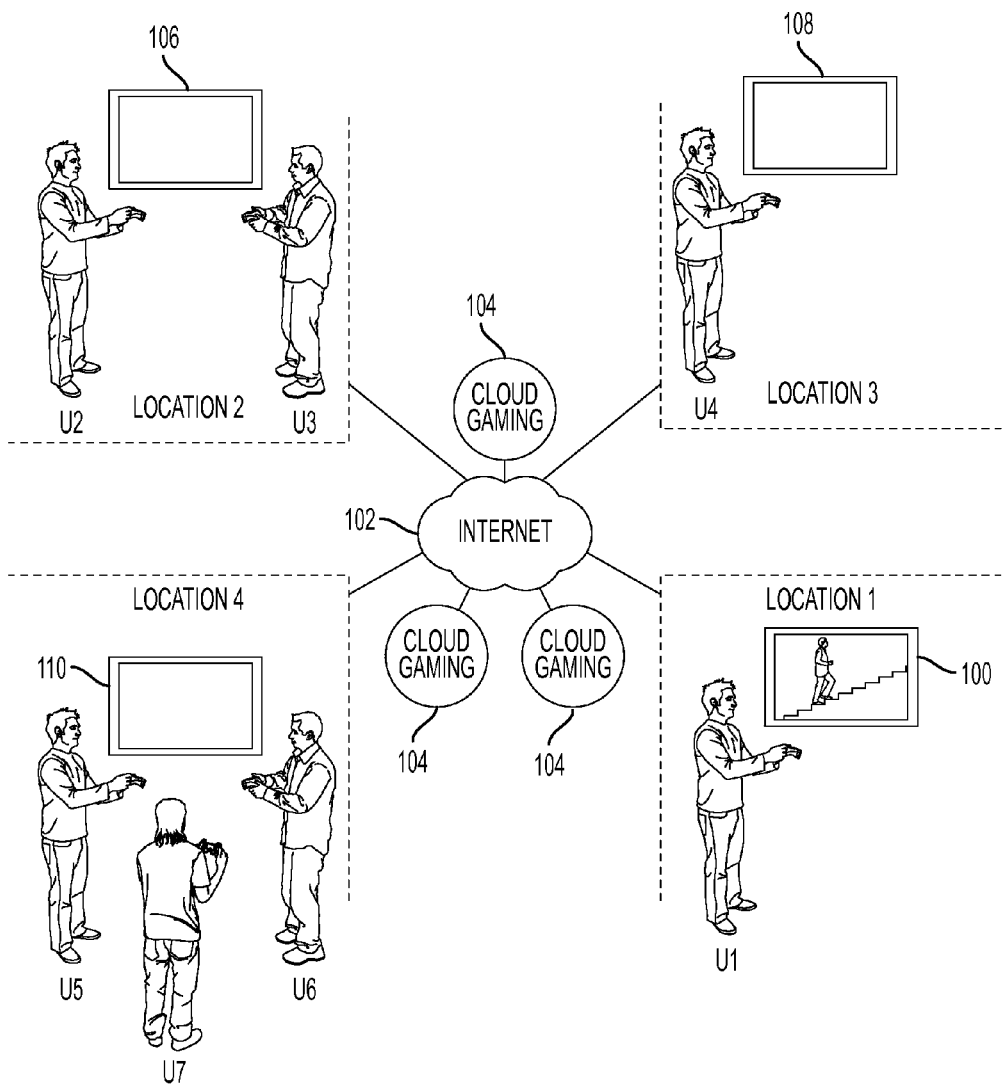
FIG. 1B illustrates multiple users in multiple locations engaged in gameplay of cloud-based video games.

FIG. 1B illustrates multiple users in multiple locations engaged in gameplay of cloud-based video games. The user U1 is shown at a first location interacting with a video game rendered on the display 100. Users U2 and U3 are shown at a second location interacting with a video game rendered on a display 106. A user U4 is shown at a third location playing a video game rendered on a display 108. Users U5, U6, and U7 are shown at a fourth location interacting with a video game rendered on a display 110.

At each of the first, second, third, and fourth locations, at least one computing device is provided for processing input from the various users and rendering a cloud-based video game on their respective displays. It should be appreciated that the computing device can be integrated into a display, or may be a standalone device such as a personal computer, set top box, gaming console, or any other type of device having at least one processor and memory for processing and storing data. The computing device can execute or define a client, as has been described above. The computing devices are networked, and communicate over a network, such as the internet 102, with cloud gaming servers 104.

The cloud gaming servers 104 execute the various video games which are being played by the users, defining a given video game's game state from moment to moment, and sending video data (including image data and audio data) to a computing device at a particular location. The computing device at a given location processes input from the user(s) playing the video game, and transmits input data to the cloud gaming server, which in turn processes the input data to affect the game state of the video game. It should be appreciated that cloud-based gaming facilitates multi-player gaming from players located at different locations by providing for execution of the video game at a remote server that is accessible by all players over a network. In this manner, execution of the video game is not dependent on any single player's hardware or network conductivity, though such will affect the user experience for that given player.

Figure 2A:
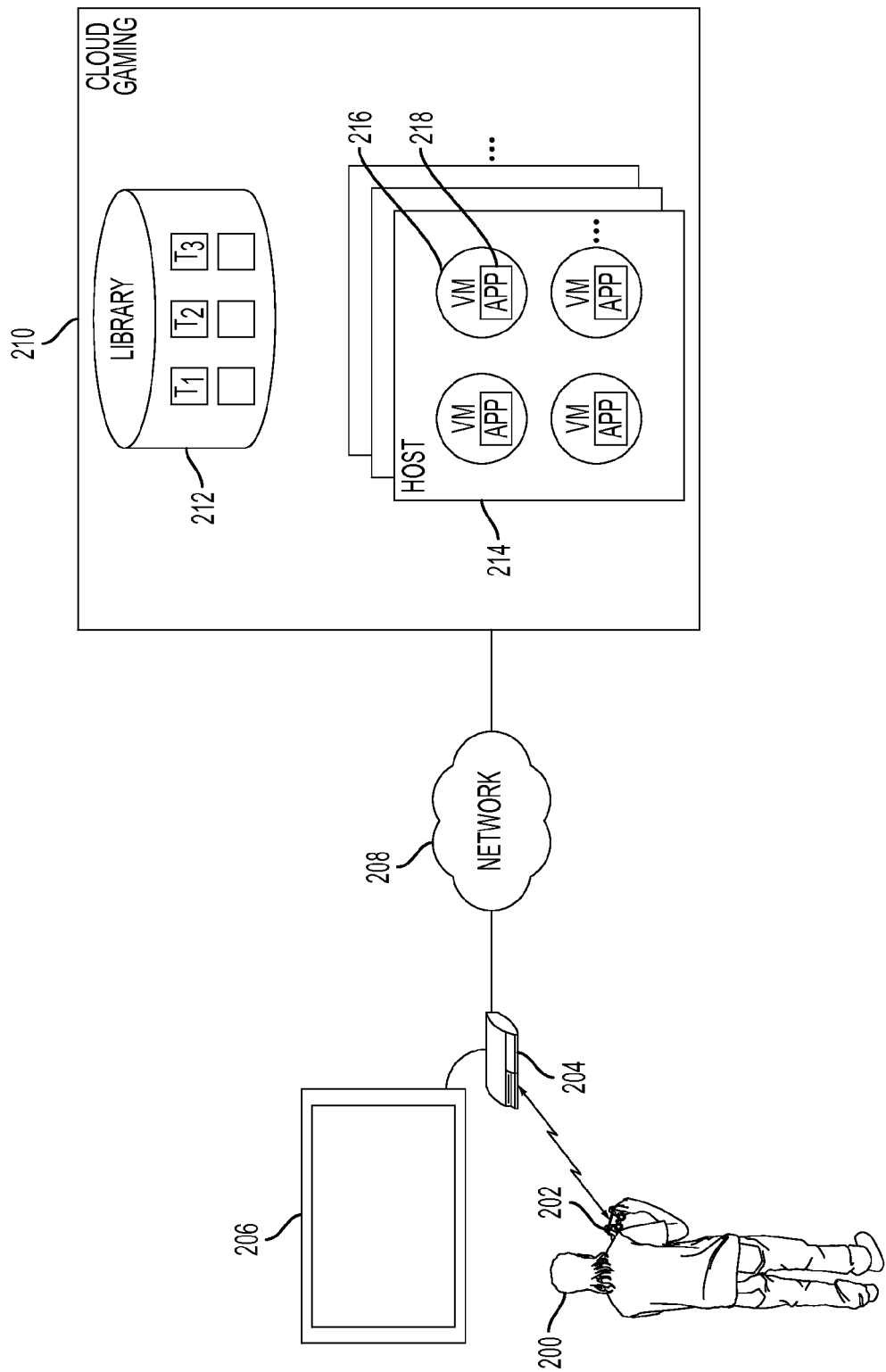
FIG. 2A illustrates a system for cloud gaming, in accordance with an embodiment of the invention.

FIG. 2A illustrates a system for cloud gaming, in accordance with an embodiment of the invention. As shown, a user 200 operates a controller 202 to provide input to a cloud-based video game. The controller 202 can include any of various kinds of input devices, such as buttons, joysticks, a touchpad, trackball, and motion sensing hardware such as accelerometers, and magnetometers, and gyroscopes. In one embodiment, the controller 202 can include an illuminated object that can be tracked to determine the location of the controller 202. The controller 202 can communicate wirelessly with a thin game client 204. The client 204 communicates over a network 208 with a cloud gaming service 210. The client 204 processes data from the controller 202 to generate input data that is communicated to a video game executed by the cloud gaming service 210. Additionally, the client 204 receives video data from the cloud gaming service 210, for rendering on the display 206. In one embodiment, the client 204 may process the received video data so as to provide a video stream in a format compatible with the display 206. In one embodiment, the client 204 can include a camera for tracking a controller device or an object located on the controller device. As has been noted, the object can be illuminated to further facilitate tracking based on analysis of captured image frames from the camera.

The cloud gaming service 210 includes resources for providing an environment in which a video game can be executed. Broadly speaking, resources can include various kinds of computer server hardware, including processors, storage devices, and networking equipment, which can be utilized to facilitate execution of a video game application. In the illustrated embodiment, a video game library 212 includes various game titles. Each game title defines executable code as well as associated data and asset libraries which are utilized to instantiate a video game. The host 214 can be a single computing device that defines a platform for instantiating virtual machines 216. In another embodiment, the host 214 can itself be a virtualized resource platform. In other words, the host 214 may operate over one or more server computing devices, handling the allocation and usage of the resources defined by the server computing devices, while presenting a unified platform upon which virtual machines 216 can be instantiated.

Each virtual machine 216 defines a resource environment which can support an operating system, upon which a video game application 218 can be run. In one embodiment, a virtual machine can be configured to emulate the hardware resource environment of a gaming console, with an operating system associated with the gaming console being run on the virtual machine to support the running of game titles which were developed for that gaming console. In another embodiment, the operating system can be configured to emulate a native operating system environment of a gaming console, though the underlying virtual machine may or may not be configured to emulate the hardware of the gaming console. In another embodiment, an emulator application is run on top of the operating system of a virtual machine, the emulator being configured to emulate the native operating system environment of a gaming console so as to support video games designed for that gaming console. It should be appreciated that a variety of current and legacy gaming consoles can be emulated in a cloud-based gaming system. In this manner, a user can access game titles from different gaming consoles via the cloud-gaming system.

When the user 200 requests to play a specific video game title, the video game title is retrieved from the library 212. If a compatible virtual machine has not been already instantiated or is not available for use, then a new compatible virtual machine is instantiated on the host 214. The retrieved video game title is then executed as an application 218 on the available or newly instantiated virtual machine 216. In one embodiment, this can entail determining the appropriate platform for the video game title (e.g. which gaming console or operating system the game requires to run) and assigning the video game title to an appropriate virtual machine for execution, e.g. one having an emulator application capable of handling execution of the video game title. The executing video game communicates with the game client 204 to provide an interactive gaming experience for the user 200. More specifically, the executing videogame application 218 receives input data from the client 204 over the network 208. The application 218 processes the input data to update the game state of the executing application. As the game state changes, the application 218 outputs video data that is sent to the client 204 for rendering on the display 206. Additionally, the application 218 may also output feedback data to the client 204 that is utilized to provide an additional feedback mechanism to the user. By way of example, the user's controller 202 may include a tactile vibration feedback mechanism that can be activated based on the output feedback data from the video game application.

In one embodiment, the cloud gaming system is configured to detect the type of client device associated with the user, and also a type of controller available for the user to provide input to the cloud-based video game. For example, in one embodiment, when a user logs in to the cloud gaming system, they may be presented with an option to designate the type of client device with which they are accessing the cloud gaming system. In one embodiment, a series of client device options are presented from which the user may select one corresponding to their client device. The user may also be presented with an option to designate the type of controller device they will use to play a video game. In one embodiment, a series of controller options can be presented to the user, from which the user may select to designate a controller type corresponding to their controller hardware. In other embodiments, the cloud gaming system can be configured to automatically detect the client device type and/or the controller device type.

For example, at the time of login, the client device may send information to the cloud gaming server identifying itself as well as a connected controller device (e.g. in response to a request from the cloud gaming server). Based on this information, the cloud gaming server may determine an appropriate video game output configuration and input parameter configuration to provide a gaming experience optimized for the user's client device and controller device. In one embodiment, a look-up table is employed to determine video game configuration and input parameter configuration based on a detected client device and a detected controller device.

It should be appreciated that a given video game may be developed for a specific platform and a specific associated controller device. However, when such a game is made available via a cloud gaming system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlayed during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud gaming server via a network (e.g. accessed via a local networking device such as a router). However, in other embodiments, the controller can itself be a networked device, with the ability to communicate inputs directly via the network to the cloud gaming server, without being required to communicate such inputs through the client device first. For example, the controller might connect to a local networking device (such as the aforementioned router) to send to and receive data from the cloud gaming server. Thus, while the client device may still be required to receive video output from the cloud-based video game and render it on a local display, input latency can be reduced by allowing the controller to send inputs directly over the network to the cloud gaming server, bypassing the client device.

In one embodiment, a networked controller and client device can be configured to send certain types of inputs directly from the controller to the cloud gaming server, and other types of inputs via the client device. For example, inputs whose detection does not depend on any additional hardware or processing apart from the controller itself can be sent directly from the controller to the cloud gaming server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud gaming server. These might include captured video or audio from the game environment that may be processed by the client device before sending to the cloud gaming server. Additionally, inputs from motion detection hardware of the controller might be processed by the client device in conjunction with captured video to detect the position and motion of the controller, which would subsequently be communicated by the client device to the cloud gaming server. It should be appreciated that the controller device in accordance with various embodiments may also receive data (e.g. feedback data) from the client device or directly from the cloud gaming server.

Figure 2B:
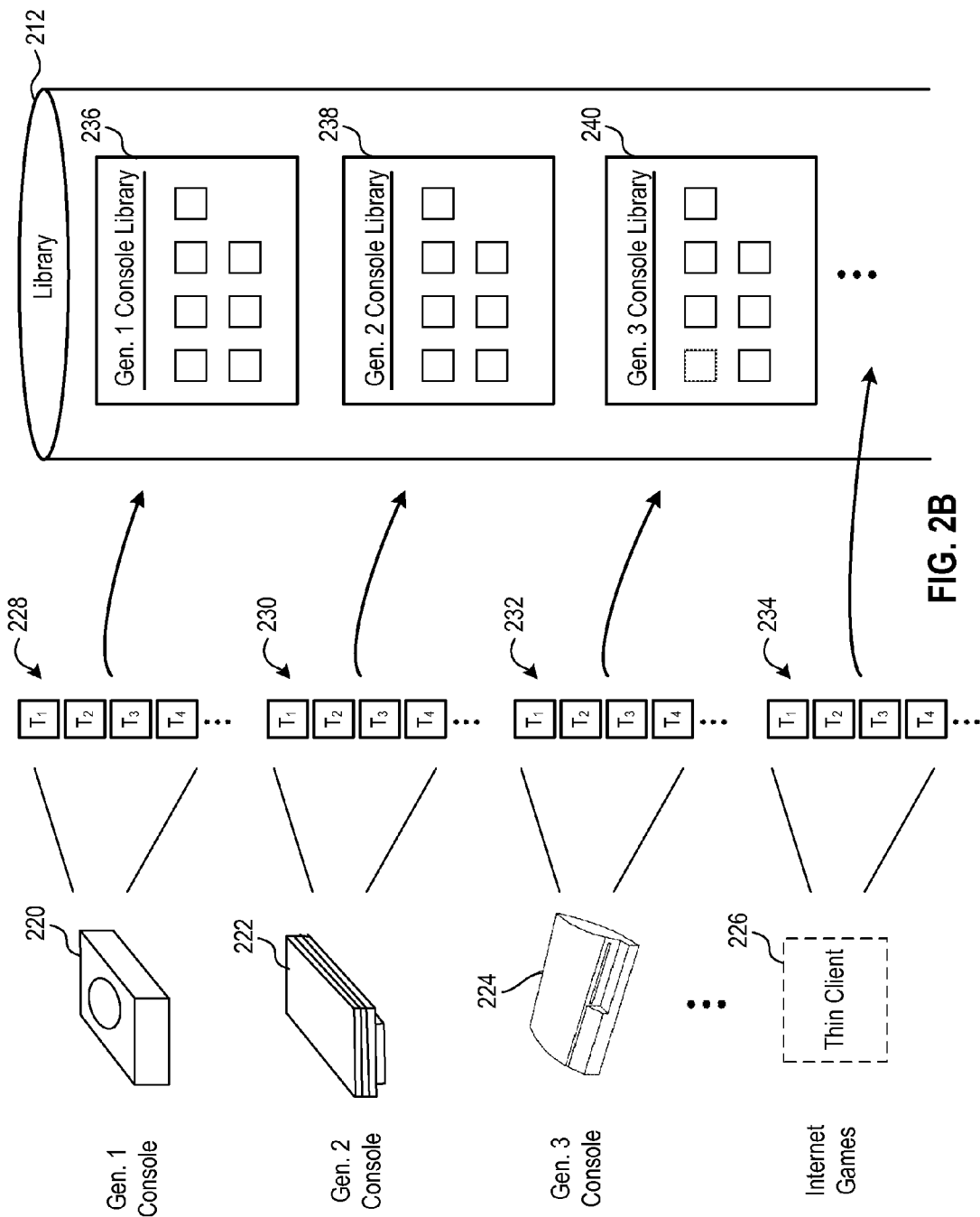
FIG. 2B conceptually illustrates the accumulation of game titles across various generations of gaming consoles, in accordance with embodiments of the invention.

FIG. 2B conceptually illustrates the accumulation of game titles across various generations of gaming consoles, in accordance with embodiments of the invention. In the video gaming industry, video games are developed for specific video game consoles. Over time a library of game titles is amassed for a specific game console. For example, in the illustrated diagram, a first generation console 220 has a collection of game titles 228 which have been developed for it. A second-generation console 222 has associated there with a collection of game titles 230 which have been developed for it. And a third-generation console 224 is also shown, having a collection of game titles 232 developed for it. In other embodiments, there may be a collection of game titles 234 which have been specifically developed as cloud-based games for use in conjunction with a client 226. Furthermore, other types of games such as Internet games can be developed and collected for distribution over a cloud gaming system, as is described herein. It will be appreciated that game titles from different generations of game consoles can be collected and consolidated in the cloud gaming library 212. As shown, the library 212 includes a first generation console library 236 which includes the game titles which have been developed for the first generation console 220. In a similar manner, the library 212 also includes a second-generation console library 238 and a third generation console library 240 which contain video games that have been developed for the second and third generation consoles, respectively. Games which have been developed for the client 226 and other types of games such as Internet games can also be included in the game library 212. As can be seen, a large number of game titles from across various generations of video gaming consoles can be amassed and made available via a cloud gaming library. As has been described, each of these games can be executed on a virtual machine that simulates the operating system environment associated with a given gaming console for which a game was developed. In this manner, users accessing the cloud-based gaming system are able to easily access and play games from across many different consoles as well as games from other contacts such as Internet games and games which have been specifically developed for use with the cloud-based gaming system.

Figure 3:
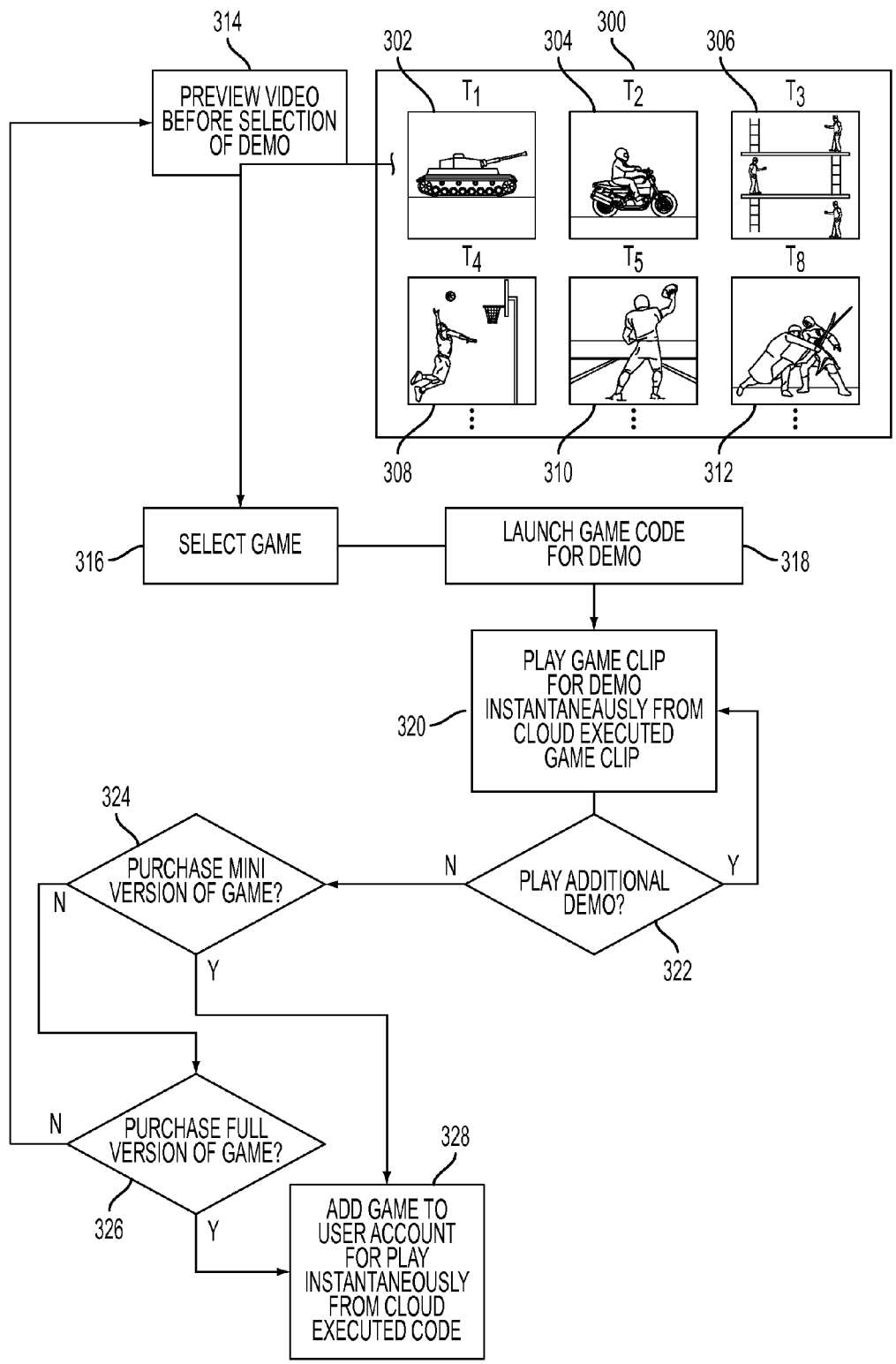
FIG. 3 illustrates a method for providing game demos to a user, in accordance with an embodiment of the invention.

FIG. 3 illustrates a method for providing game demos to a user, in accordance with an embodiment of the invention. An interface 300 is shown providing vignettes or icons 302, 304, 306, 308, 310, and 312 of various game titles that are available for demoing. Each icon can be configured to provide an image indicative of the game that it represents. In one embodiment, when a user navigates to a given icon, the icon may be activated to show an animation or video clip that is representative of the video game or which otherwise provides additional information to the user about the content of the video game. In the illustrated embodiment, a user has navigated to the icon 302, which is therefore highlighted and displays an active animation showing a scene from the video game. When a user selects an icon, a preview video may be shown in accordance with method operation 314. If the user continues to select the game at method operation 316, then at method operation 318, game code for the demo is launched. At method operation 320, the game demo is made available instantaneously for gameplay by the user. It should be appreciated that because the game demo is cloud based, it can be made available instantaneously from a preloaded instantiation of the game demo in the cloud-based system. When the game demo is launched, the preloaded instantiation of the game demo is triggered to execute. At method operation 322, it is determined whether the user wishes to continue gameplay of the game demo or play an additional demo of the videogame, if one is available. If so, then the method returns to operation 322 continued execution of the game demo or execute a new game demo for the videogame. If not, then at method operation 324, the user is presented with an option to purchase a mini version of the videogame. Additionally, at method operation 326 the user can be presented with an option to purchase a full version of the videogame. If the user chooses to purchase either a mini version or a full version of the game, then at method operation 328 that version of the game is added to the user's account. It should be appreciated that because the games are made available over a cloud-based gaming system, the addition of a game to a user's account may simply entail associating access privileges to the specific version of the game with the user's account. Furthermore, once purchased, the game can be made available practically instantaneously from the cloud-based system for gameplay by the user, especially as the game can be pre-instantiated in the cloud-based system.

Figure 4A:
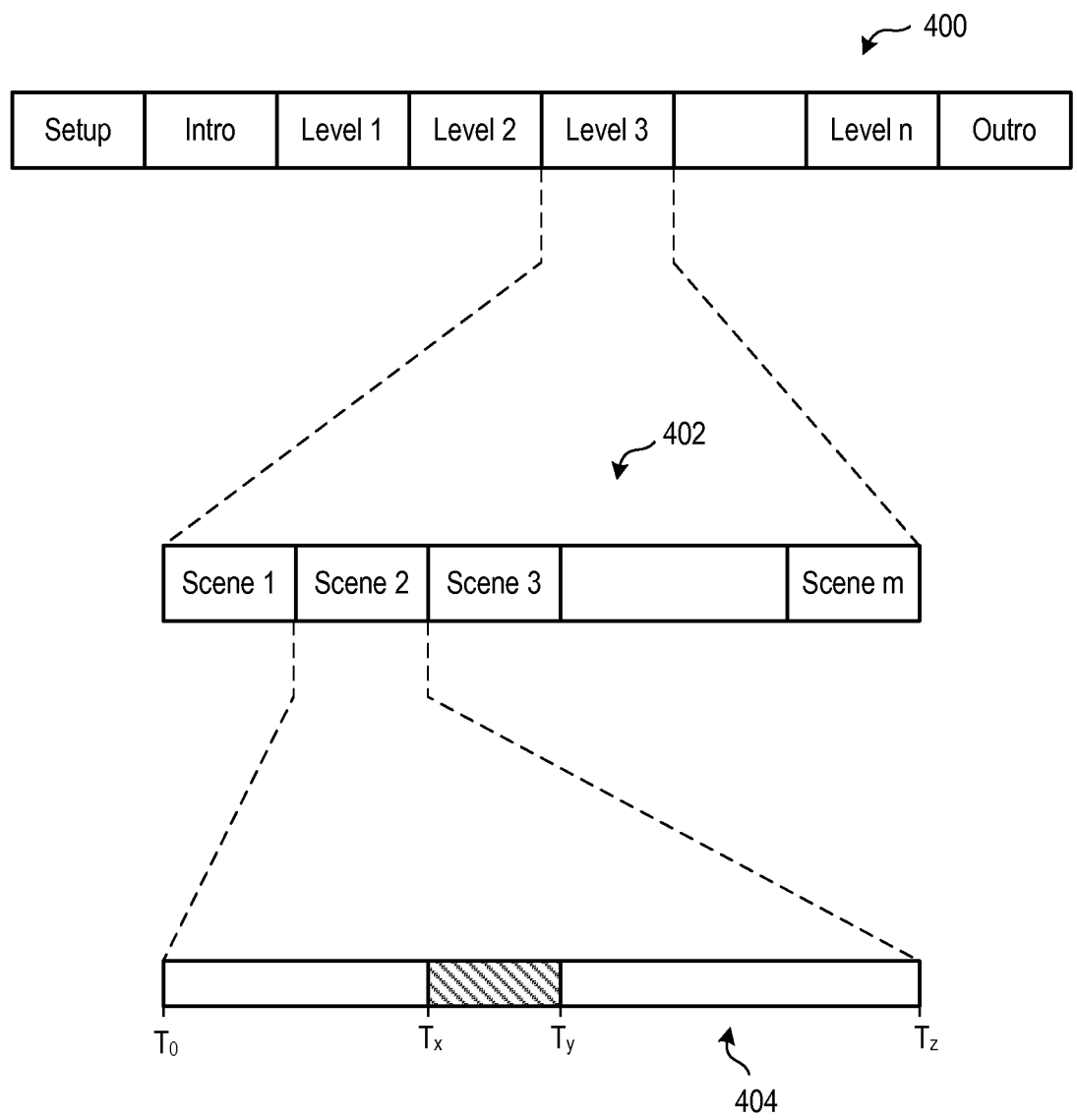
FIG. 4A illustrates the hierarchical organization of various portions of a videogame, in accordance with an embodiment of the invention.

FIG. 4A illustrates the hierarchical organization of various portions of a videogame, in accordance with an embodiment of the invention. By way of example, a videogame can be organized into various sections 400. In the illustrated embodiment, these may include a set up section, an introduction section, various level sections, and an outro section. A given level may be further divided into various scenes. As shown, the level 3 section is broken down into various scenes 402. As the user plays through a given scene, a gameplay timeline of that scene can be recorded, including recorded video of the user's gameplay as well as recorded input data and game states of the executed game application. In the illustrated embodiment, the gameplay timeline 404 as representative of the users gameplay of scene 2 of level 3 of the game. In accordance with embodiments of the invention, a user may select portions of their recorded gameplay from which to generate a mini game or game slice. For example, in the illustrated embodiment the gameplay timeline 404 has a start time $T_0$ and an ending time $T_z$. a portion of the gameplay timeline from a time $T_x$ to a time $T_y$ has been selected from which to generate a minigame.

FIG. 4B illustrates an interface for selecting a portion of a gameplay timeline for generation of a minigame or game slice, in accordance with an embodiment of the invention. In the illustrated embodiment, the interface 412 is presented on a touchscreen 411 of a device 410. In one embodiment, the device 410 is a tablet computing device. The interface 412 includes a selectable gameplay timeline 414. In an expanded view 430 of the gameplay timeline 414, it can be seen that in one embodiment the gameplay timeline 414 is represented as a film strip with adjustable markers 416 and 418. The marker 416 designates the start point along the gameplay timeline 414 of the selection, whereas the marker 418 designates the endpoint along the gameplay timeline of the selection. Furthermore, a marker 419 can be positioned within the portion of the gameplay timeline 414 that has been founded by the start marker 416 and the end marker 418. For ease of use and to provide the user with a visual understanding of what portion of their gameplay is being selected, a start frame 420 can be shown corresponding to the point along the gameplay timeline at which the marker 416 has been positioned. The start frame 420 is an image of the recorded gameplay video corresponding to the time at which the start marker 416 is positioned. Likewise, a representative end frame 424 can be shown corresponding to the point along the gameplay timeline at which the marker 418 has been positioned. In a similar manner, the end frame 424 is an image of the recorded gameplay video corresponding to the time at which the end marker 418 is positioned. Additionally, a representative frame 422 may be displayed corresponding to the position of the marker 419 along the gameplay timeline. The representative frame 422 can be utilized as a representative image for the minigame that is created based on the selected portion of the gameplay timeline. It should be appreciated that though in the illustrated embodiment a touchscreen interface is provided and described, in other embodiments various other kinds of input can be utilized to select starting and ending points to define a portion of gameplay for creation of a minigame. For example, input can be provided via a game controller, a keyboard, via gesture input, voice input, and in accordance with other types of input devices and mechanisms so as to enable selection of a portion of gameplay along with selection of a representative image frame from the recorded gameplay video.

In some embodiments the selection markers may not be continuously adjustable along the gameplay timeline, but may be configured instead to snap to pre-defined time points along the gameplay timeline. For example, predefined time points may be defined to correspond with specific events occurring in the gameplay timeline. The specific events of a given gameplay timeline for which predefined time points will be assigned can be generated based on analysis of the users gameplay, and will depend on the specific architecture of the videogame gameplay. In one embodiment, predefined time points can be assigned based on geographical location of a character within a virtual world defined by the videogame. For example, predefined time points can be assigned to the specific times at which a character moved from one geographical locale to another geographical locale, e.g. movement from one scene location to another scene location, movement from one city to another city, entering a structure, entering a room within a structure, entering the vehicle, entering a different type of environment, or any other kind of geographical transition of significance. In another embodiment, predefined time points can be assigned based on development of a user's character or entity which is controlled in the videogame. For example, predefined time points can be assigned when a character or entity controlled by the user accomplishes a task, acquires a skill, acquires an object, passes a level or otherwise completes a portion of the videogame, or performs or achieves any other kind of significant activity in the video game.

Figure 4C:
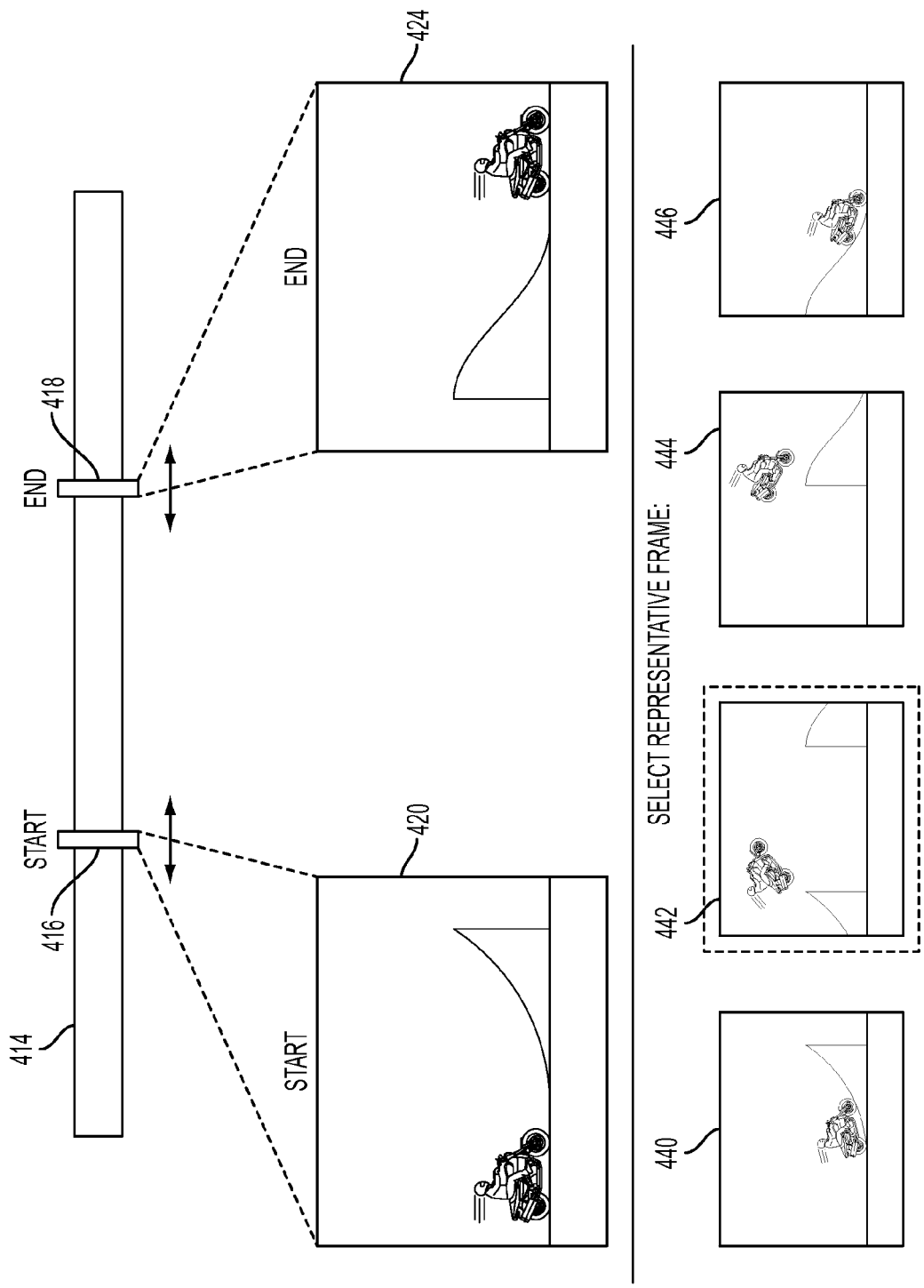
FIG. 4C illustrates an interface for selecting a portion of a gameplay timeline for generation of a minigame, in accordance with an embodiment of the invention.

FIG. 4C illustrates an interface for selecting a portion of a gameplay timeline for generation of a minigame, in accordance with an embodiment of the invention. A gameplay timeline 414 graphically illustrates a timeline along which the user may set start and end markers 416 and 418, so as to designate a selection of the gameplay from which to generate a minigame. A start frame 410 corresponding to the start marker's 416 position is shown, as well as an end frame 424 corresponding to the end marker's 418 position. Additionally, a number of candidate frames 440, 442, 444, and 446 are presented, from which the user may select one to be utilized as a representative frame for the minigame. The candidate frames can be determined according to a variety of methods. For example, candidate frames may be presented from fractional intervals of the selected portion of the gameplay timeline. The intervals can be equivalent, such that the candidate frames are equally spaced along the gameplay timeline, or the intervals may be non-equivalent, such that some frames are more proximate to each other than others along the gameplay timeline. In one embodiment, a higher density of candidate frames are generated from earlier portions of the selected portion of the gameplay timeline as compared to later portions of the selected portion of the gameplay timeline. In one embodiment, a higher density of candidate frames are generated from both early and later regions of the selected portion of the gameplay timeline, whereas a lower density of candidate frames are generated from central portions of the selected portion of the gameplay timeline.

After a user has selected a portion of gameplay from which to create a minigame, embodiments of the present invention provide for systems and methods to create a playable minigame based on the selected portion of gameplay. More specifically, the minigame enables another user to play substantially the same portion of the video game that the original user played, and possibly under substantially the same conditions and parameters. In this sense, the minigame is more than simply a replay video of the original user's gameplay, but is a playable portion of the video game itself that has been designated based on user selection of their own gameplay. A secondary user may thus experience a substantially similar gameplay experience to that of the original user.

Figure 5:
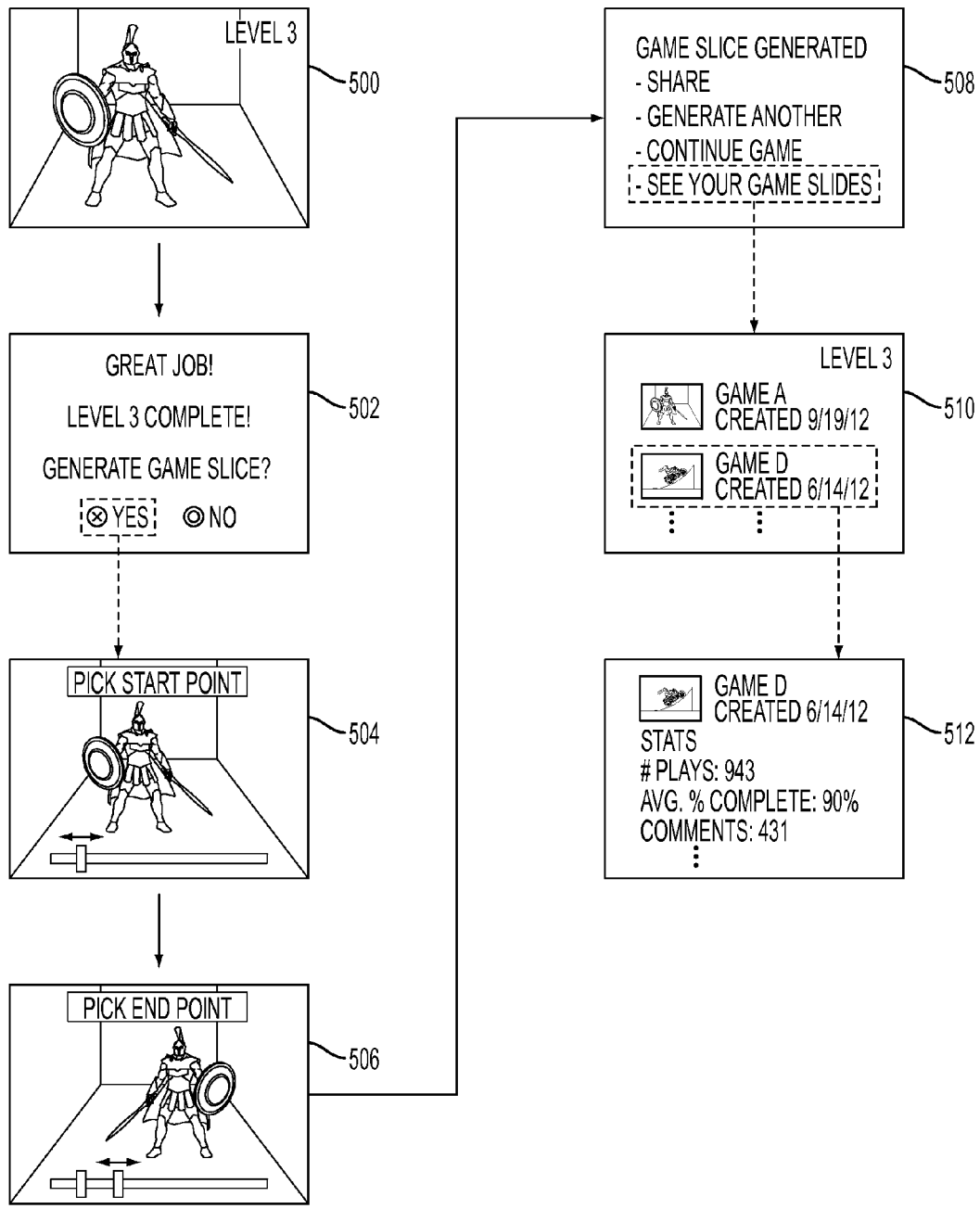
FIG. 5 illustrates a series of screenshots demonstrating a method for generating a minigame from an existing cloud-based videogame, in accordance with an embodiment of the invention.

FIG. 5 illustrates a series of screenshots demonstrating a method for generating a minigame from an existing cloud-based videogame, in accordance with an embodiment of the invention. Screenshot 500 shows the videogame play of a user. In the illustrated embodiment, the user place a level 3 of a videogame. At screenshot 502, the user has completed level III of the videogame. Upon completion of the level, the user is provided with an option to generate a game slice or minigame based on the user's gameplay of that level. When the user opts to generate a game slice, then at screenshot 504 the user is presented with an interface to select a starting point for the game slice from the user's recorded gameplay. As has been described, a representation of a gameplay timeline can be shown with an adjustable slider which the user may move to designate a starting point for the game slice. After the user has defined the start point, then at screenshot 506, the user is presented with the interface configured to allow selection of an endpoint for the game slice. Again, an adjustable slider is moved by the user to designate the endpoint along the representative gameplay timeline in the interface. After the start and end points from the gameplay timeline of the user are designated, the game slice or minigame is generated by the system, as described elsewhere herein. At screenshot 508, the user can be presented with additional options, such as an option to share the newly created game slice with other users or otherwise inform other users of the newly generate game slice, an option to generate another game slice from the same gameplay timeline, an option to continue gameplay of the current videogame, an option to view the user's existing game slices, etc. If the user selects to view their existing game slices, then at screenshot 510, an interface is shown displaying the user's previously created game slices. In the illustrated embodiment, the user can select one of the previously created game slices, and view information and statistics related to that game slice, as shown at screenshot 512. The information and statistics related to a given game slice can include any of the following: a title of the game slice, the videogame from which the game slice was originally created, the date the game slice was created, the number of times the game slice has been played by other users, a completion percentage indicating an average percentage of the game slice that is completed by users who undertake to play the game slice, comments left by other users, etc.

Though in the currently described embodiment, an option to generate a game slice is presented to a user following completion of a level of the videogame, it should be appreciated that in other embodiments the user can generate a game slice at any other time during or outside of gameplay of the videogame, provided that recorded gameplay of the videogame exists from which a selection may be defined by the user for a game slice. For example, in one embodiment an interface can be presented which provides access to various recorded gameplay from various video games that are associated with the user. The user may select gameplay of a specific videogame and generate a game slice by selecting a portion of the recorded gameplay from which to generate the game slice in accordance with embodiments described herein.

Figure 6:
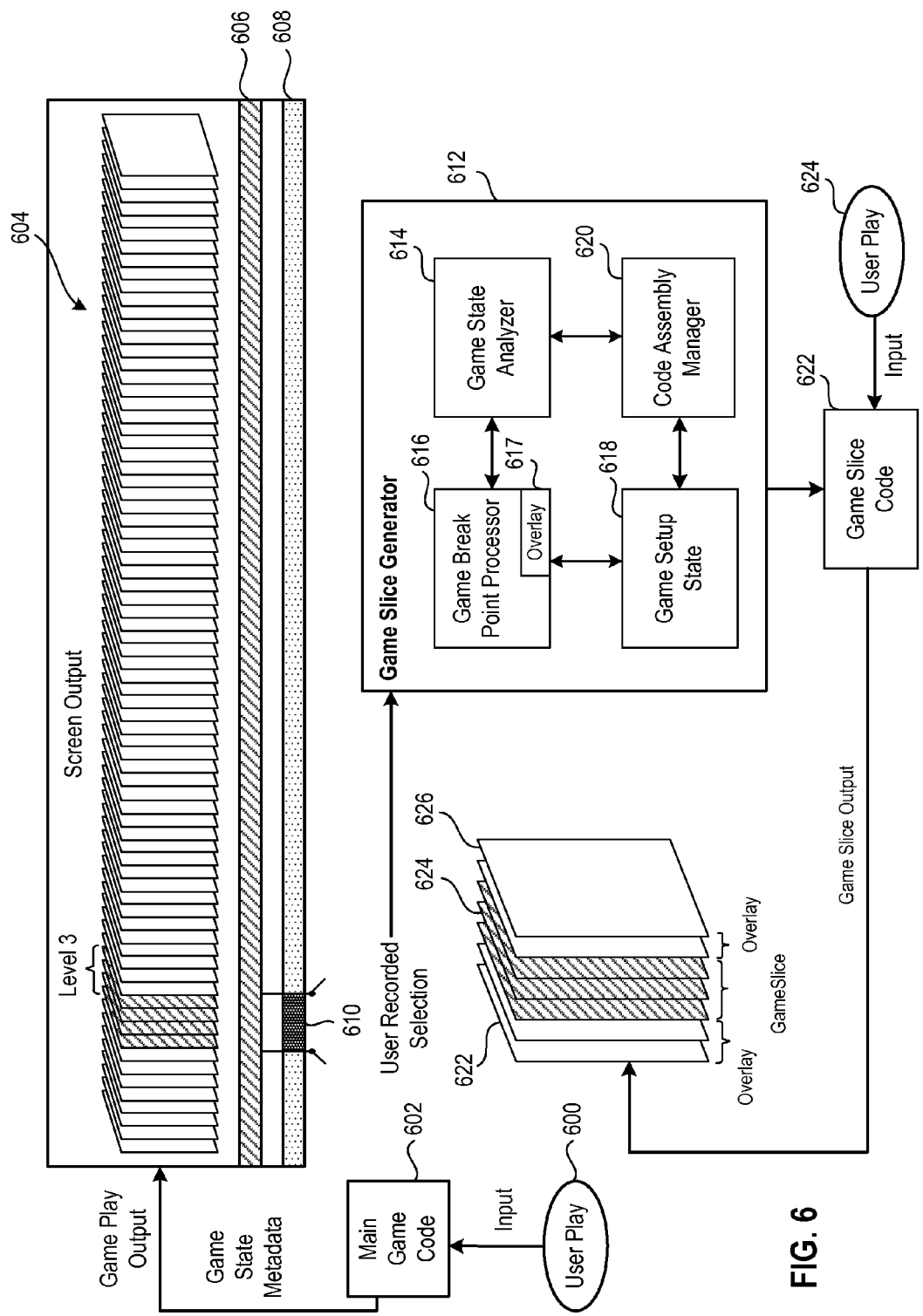
FIG. 6 illustrates a system for generating game slice code, in accordance with an embodiment of the invention.

FIG. 6 illustrates a system for generating game slice code, in accordance with an embodiment of the invention. The terms game slice and minigame are used interchangeably herein to define a discreet and playable portion of a videogame that is generated based on user selection from existing recorded gameplay. In the illustrated embodiment, the user gameplay 600 conceptually represents a user interacting with a full version of a videogame. Main game code 602 is executed to define the full version of the videogame displayed by the user. As the video game is played, it generates various types of gameplay output, including video data, game state data, and user input data. These can be recorded so as to define the user's recorded gameplay. In the illustrated embodiment, an image stream 604 conceptually or presents the video data output by the videogame. Game state metadata 606 and user input data 608 are also shown. The game state data 606 includes data defining the game state of the executing videogame from moment to moment during gameplay. Game state data can include the values of any variables which define the execution state of the videogame. The user input data is data generated by capturing user initiated actions occurring during interactivity with the videogame, such as may be provided via activation of input devices on controller devices, detection of sensor data (e.g. motion sensors), captured audio input, and the like.

As has been described, a user interface can graphically depict the user's recorded gameplay to facilitate selection by the user of a portion of the user's gameplay from which to generate a game slice. In the illustrated embodiment, the user has defined a selection 610 from their recorded gameplay. This selection of the user's recorded gameplay is utilized by a game slice generator to generate game slice code 622 which defines a limited game based on the selected portion of the user's gameplay. The game slice generator 612 includes a game state analyzer 614 which analyzes the game state of the recorded selection 610. Based on the analysis of the game state of the recorded selection, a game breakpoint processor determines appropriate breakpoints to define the beginning and ending of the game slice. Breakpoints can be defined based on geography, time, task or goal accomplishment, scene boundaries (physical or temporal), or any other aspect of a video game according to which the video game's gameplay can be segmented to generate a game slice. A brief description of some illustrative embodiments will serve to highlight certain possibilities for breakpoint determination.

For example, some video games entail control of a character that can be moved from one geographic scene or locale to another scene or locale. The selected portion of the user's gameplay may be determined to be generated from gameplay at a particular scene. In such an embodiment, the boundaries of the particular scene can define the geographic breakpoint for the game slice, selecting the scene to the exclusion of other scenes, which can entail exclusion of other adjacent or adjoining scenes, as well as scenes which are non-adjacent or non-adjoining or otherwise less related or unrelated to the particular scene. It should be appreciated that the recorded gameplay selection 610 may entail gameplay from multiple scenes, in which case, the game breakpoint processor 616 may be configured to define breakpoints according to the boundaries of the multiple scenes which are utilized for the recorded gameplay selection.

It should be noted that a scene can be both geographic and temporal in nature. That is, the scene may not only define a geographic region within a virtual space defined by the video game, but may also be configured to exist during a certain time or at a particular chronological point within the larger context of the video game. Such a scene may have defined objectives or goals that are to be accomplished by the player. Thus, game breakpoints can be defined based on chronology or other temporal aspects as defined by the video game.

Furthermore, a given scene may have associated objects or features which are presented as part of the scene during gameplay. These objects or features may be analyzed to define further breakpoints according to their inclusion. For example, the objects in the scene may be taken from a subset of an asset library, in which case the subset of the asset library can be defined for the game slice by the game breakpoint processor 616, to the exclusion of other objects in the asset library which are not utilized in the scene(s) associated with recorded gameplay selection. It should be understood that objects and features can be dynamic elements of a given scene, with associated mechanisms defining their change in response to events occurring in the video game. For example, an object might have a damage modeling module that determines and adjusts the appearance of the object when it is damaged (e.g. when struck by a weapon). Or a feature could be a vehicle that is made available during the scene, with the vehicle having associated logic which defines its appearance during gameplay as well as its operation and response to user input. Such logic or damage modeling can further define game breakpoints for generation of the game slice.

Various aspects of a video game which define or are otherwise utilized for a selected portion of a video game can be the basis for defining a game breakpoint. The presently described examples are provided by way of example only and not by way of limitation. It should be appreciated that in other embodiments, other aspects of a video game can form the basis for defining breakpoints to generate a game slice.

In one embodiment, a video game may be organized into various scenes which must be completed in a linear fashion, such that a later scene cannot be attempted until its preceding scene has first been completed. Each scene can include a number of objectives or goals, some of which may be required for completion of the scene, and some of which may be optional for completion of the scene. Objectives can include navigating from a starting location to a predefined ending location within the scene, surviving for a predefined length of time, destroying a predefined number of enemies, acquiring a certain number of points, defeating a particular enemy, or any other activity which can define an objective within the game. A scene may have various predefined completion points, that is, points wherein the user, once having achieved the completion point, is able to return to that point if the user becomes unable to continue gameplay for some reason (e.g. user quits the game, the user's game character dies or runs out of lives or health, user's vehicle crashes, etc.). At predefined completion points, a video game may be configured to automatically save the user's progress, or present an option for the user to save their progress.

In one embodiment, the game breakpoint processor 616 is configured to define a game breakpoint at predefined completion points. In one embodiment, this is accomplished by finding the nearest completion points to the selected start and end points of the user's recorded gameplay selection, and utilizing these nearest completion points to define the game breakpoints for the game slice. In another embodiment, the nearest completion point occurring before the selected start point of the recorded gameplay selection is utilized to define a starting breakpoint, whereas a nearest completion point occurring after the selected end point of the recorded gameplay selection is utilized to define an ending breakpoint for the creation of the game slice. In still another embodiment, if a completion point lies within a predefined radius of (e.g. either before or after) either of the start or end points of the user's recorded gameplay selection, then that completion point is utilized to define a corresponding start or end game breakpoint for the game slice. Whereas if no completion point lies within the predefined radius, then a game breakpoint is defined that more closely matches the user's selected start or end point for the recorded selection. In other embodiments, the predefined radius for the start and end points may differ for purposes of determining whether to utilize an existing completion point to define a game breakpoint.

As has been discussed, the game breakpoint processor 616 determines appropriate breakpoints applicable to various aspects of the videogame based on analysis of the users recorded gameplay selection. The breakpoints defined by the processor 616 serve to define the limited scope of the game slice that will be produced based on users recorded gameplay selection. In one embodiment, an overlay processor 617 is provided for generating overlays that may contribute to an improved user experience when playing the game slice generated by the game slice generator 612. For example, in one embodiment the overlay processor 617 defines pre-game slice data which defines video or gameplay or additional information that can be provided as an introduction to the game slice prior to actual gameplay of the game slice. One example of pre-game slice data is an introductory video which can provide context to a user who initiates gameplay of became slice. In another embodiment, pregame slice data can define introductory gameplay for the game slice, that may provide a user an opportunity to learn skills that may be useful or required for playing game the slice. In another embodiment, pregame slice data may define a series of one or more informational screens or images which provide information about the game slice to the user. Such information may include controller configuration, story background information, objectives or goals, maps, or any other type of information relating to the game slice which may be useful for the user or otherwise improve the user's experience of playing the game slice.

The overlay processor 617 can also be configured to define postgame slice data. In some embodiments, the postgame slice data can define video or images to be shown following completion of game play of the game slice. For example, a congratulatory video might be shown after a user completes the game slice. Such a video may be customized based on the user's gameplay of the game slice, for example, by showing information or images that are based on the user's gameplay. In one embodiment, the postgame slice data can define a playback mechanism to play recorded portions of the user's gameplay of the game slice following its completion. In another embodiment, the postgame slice data can be configured to display statistics about the users gameplay of the game slice, and may indicate a comparison of the users gameplay to that of other users or that of the original creator of the game slice. In still other embodiments, the postgame slice data can define additional interactive elements to be presented to the user upon completion of the game slice. These may include options to purchase in part or in whole the video game upon which the game slice is based, redirect options to additional sources of information relating to the videogame, etc.

In some embodiments, the overlay processor 617 can be configured to define elements which are overlaid into the game slice. These may include elements that may be customized by a user playing the game slice, such as customization of characters, objects, properties, and other types of customization options. In some embodiments, the overlay processor 617 may be configured to define simplified elements for a game slice so as to reduce the complexity of the game slice code and the amount of resources required to execute the game slice. By way of example, many video games include artificial intelligence (AI) entities such as characters, vehicles, enemies, etc. These AI entities may in the full videogame be governed by artificial intelligence models that define the reaction and activity of the AI entities based on events occurring in the videogame. However, in the context of a game slice which is of limited scope, it may be acceptable to simply define the activity of an AI entity through hardcoded definition or simplified extrapolations, rather than fully modeling the activity of the AI entity as would be the case in the full videogame.

For example, if in the recorded gameplay selection of the full videogame a given AI character moves in a certain manner according to its AI model that is unlikely to change in the game slice, then it may be more efficient to define an approximation of the AI character's movement for the game slice. Such an approximation would not require the full AI model to be included as part of the game slice code, yet would provide to the user playing the game slice a substantially similar experience with respect to that AI character to that of the original user's gameplay from which the game slice was generated. The resource savings realized through approximation of AI entities activity can be even more significant when multiple AI entities are present and interacting in the user's recorded gameplay selection. For each of the AI entities may have AI models that depend upon the output of those of the other AI entities. However, when gameplay has been recorded the activity of each of these AI entities is known, and therefore can be reproduced in the game slice through simplified mechanisms such as direct encoding of their controlling variables and approximation of their activity.

With continued reference to FIG. 6, a game set up state processor 618 is provided for defining an initial state of the game slice. Based on the operation of the game state analyzer 614, the game breakpoint processor 616, and the game set up state processor 618, a code assembly manager 620 assembles various code portions to define the game slice code 622. When the game slice code 622 is executed, user gameplay 624 provides input to define the state of execution of the game slice code, which produces gameplay output including video data and feedback data for rendering the game slice to the user. The video data can include pregame slice overlay video 622, game slice video 624 which is the video resulting from gameplay of the game slice, and postgame slice overlay video 626.

It should be appreciated that in one embodiment, the game slice code 622 is fully self-contained, including all code portions which are required to execute the game slice. However, in other embodiments, the game slice code 622 may incorporate references or pointers to existing code portions in the main game code of the full video game. Furthermore, the game slice code 622 may include reference or utilize existing assets in asset libraries of the main game code of the full video game. However, in other embodiments, new asset libraries can be generated for the game slice code.

FIG. 7A illustrates modification of a virtual space for purposes of generating a game slice of a video game, in accordance with an embodiment of the invention. The map 700 represents a scene or a geographical portion of a video game. The map as shown is a two-dimensional representation that may be representative of a three-dimensional virtual space that is navigated and experienced during actual gameplay of the video game. As shown, the map 700 illustrates a region 702, and several paths 704, 706, 708, and 710. In the recorded gameplay of the video game, a user's character 712 moves from the region 702 to the path 710. Based on this recorded movement and other analysis of the gameplay of the video game, it may be determined that the additional paths 704, 706, and 708 are not necessary for generation of the game slice. The paths may represent incorrect choices as compared to the path 710, or may lead to areas that are not relevant to the game slice, or may detract from a game slice player's ability to follow the path and experience similar gameplay to that of the original user. Further, if the areas to which the paths 704, 706, and 708 lead are not to be supported in the game slice, then the inclusion of such paths could cause confusion among players, or at the least be a poor user experience. Therefore, in a modified map 720, the paths 704, 706, and 708 are made unavailable for gameplay in the game slice, whereas the path 710, as well as the region 702 remain unchanged. Thus, when a user plays the game slice that incorporates the topography defined by the map 720, he will experience a virtual space wherein the paths 704, 706, and 708 are not available to traverse. The user will then be more likely to traverse the path 710 as the original user did, thus experiencing similar gameplay.

It will be appreciated that the portion of a virtual space defined for a game slice or minigame can be defined by boundaries which are determined based on the user's recorded gameplay. The boundaries will define a sub-region of the larger virtual space, and include a subset of the features which are available in the larger virtual space. In some embodiments, virtual space boundaries can be determined by determining locations in the virtual space defined by the user's gameplay, and then determining predefined boundaries associated with the virtual space that are nearest to those locations and arranged so as to encompass them. For example, a user's gameplay may define a path traversed by a user's video game character. This path can be analyzed, and based on the path's location in the virtual space, a set of predefined boundaries can be selected so as to define a region encompassing the path. In some embodiments, predefined boundaries can be defined by specific features which inherently define portions of the virtual space, e.g. doors, windows, walls, rooms, hallways, fences, roads, intersections, hallways, etc.

FIG. 7B illustrates modification of a scene graph for purposes of generating a game slice, in accordance with embodiments of the invention. A scene graph 730 conceptually illustrates the organization of various scenes A through G of a video game. It should be appreciated that scenes as described herein can be geographic and/or temporal in nature, and each may represent a playable portion of a videogame, such as a stage, a level, a section, a location, or any other organizational unit within the videogame according to which a player may progress from one scene to another scene. In the scene graph 730, various nodes are shown representative of the scenes A through G. As shown, a player may progress from scene A to scene B, and from scene B to either of scenes D or E. The player may also progress from scene A to scene C, and from scene C to either of scenes F or G. The scene graph 730 is illustrative of the scene organization of the full video game. However, for purposes of creating a game slice, not all of the available scenes may be required to the game slice. Thus, by way of example, a scene graph 732 illustrates the organization of scenes for a game slice. As shown, the scene graph 732 includes scenes A, B, C, and F, but not the remaining scenes which were included in the scene graph 730 of the full video game. Thus, a user may progress from scene A to either of scenes B or C, and from scene C to scene F. However, the other scenes from the full video game scene graph 730 are not available for gameplay in the game slice. As has been described, systems in accordance with embodiments of the invention can be configured to limit the inclusion of scenes when generating a game slice. In this manner, the game slice does not include scenes which are not required for the limited context of its gameplay and intended purpose.

Figure 8:
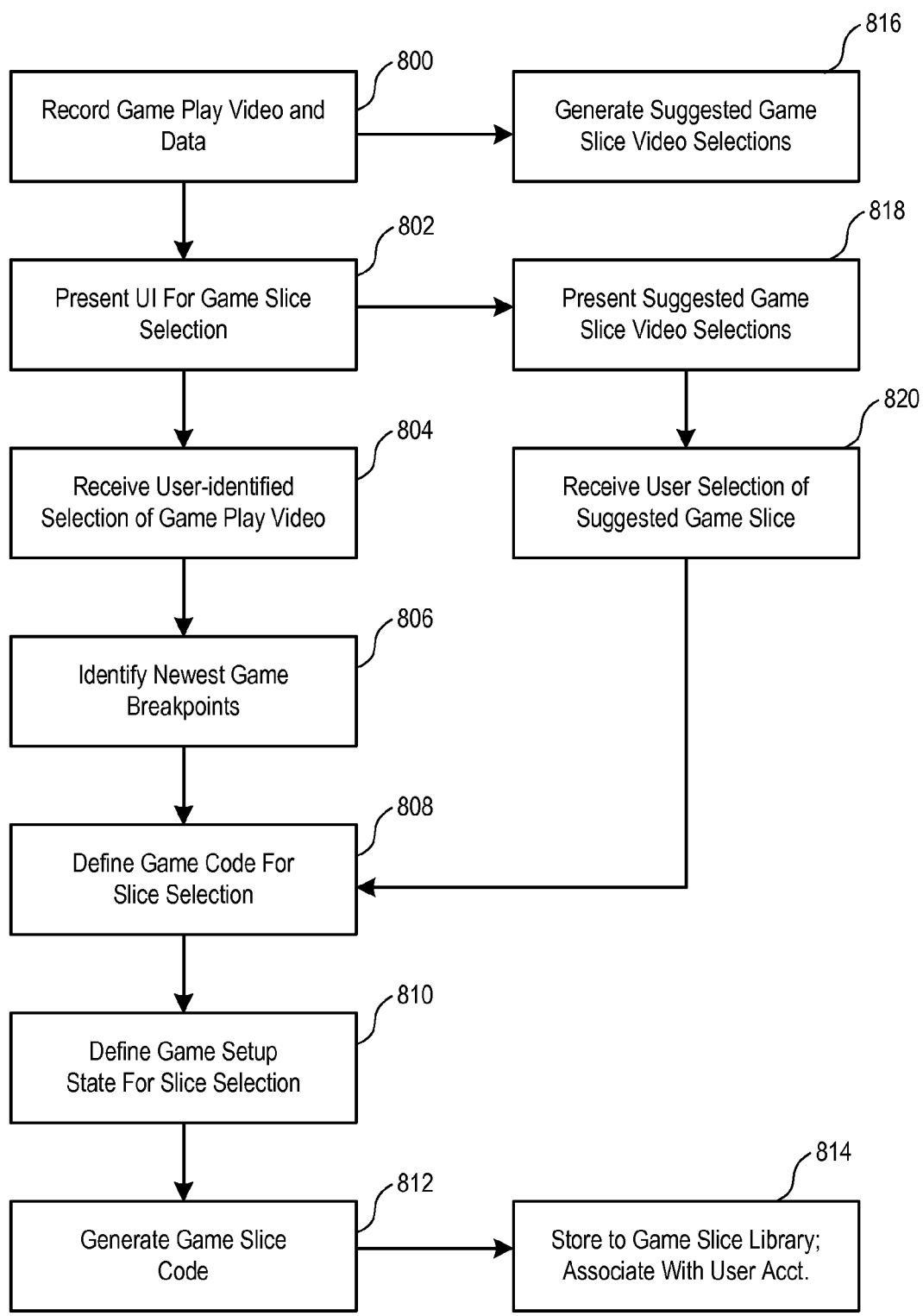
FIG. 8 illustrates a method for generating a game slice, in accordance with an embodiment of the invention.

FIG. 8 illustrates a method for generating a game slice, in accordance with an embodiment of the invention. At method operation 800, a users gameplay of a videogame is recorded, including recording of video of the users gameplay and videogame data such as input data and game state data of the videogame. At method operation 802, a user interface is presented for selection of recorded gameplay to generate a game slice. The interface defines mechanisms for receiving user input to define start and endpoints from the recorded gameplay. For example, an interface for reviewing the recorded gameplay video can be provided so as to allow the user to define start and endpoints within the gameplay video based on navigation or playback of the gameplay video. At method operation 804, the user-defined selection of gameplay video is received. At method operation 806, videogame breakpoints are identified based on the received user-defined selection of gameplay video. In one embodiment, there are predefined breakpoints for the videogame. Based on the user-defined selection of gameplay video, the game breakpoints which are nearest to the start and end points of the user-defined selection can be chosen as the game breakpoints for the game slice to be generated. At method operation 808, the game code is defined for the slice selection as defined by the identified breakpoints. That method operation 810, the game set up state is defined for the slice selection. In one embodiment, the game set up state is based on a game state which existed during the user's recorded gameplay. Method operation 812, the game slice code is generated, and at method operation 814, the game slice code is stored to a game slice library and associated with the user's account.

In one embodiment, the method can include method operation 816, wherein suggested game slice video selections are generated based on the recorded gameplay video and data of the user. Suggested selections of the users gameplay can be determined based on analysis of the recorded gameplay of the user. For example, portions of the gameplay wherein a high level of activity (e.g. a level of activity exceeding a predefined threshold) is detected might be suggested as possible game slice video selections. At method operation 818, the aforementioned user interface for game slice selection can present the suggested game slice video selections to the user. In one embodiment, a screenshot representative of each suggested game slice video selection can be presented to the user. At method operation 820, a selection by the user of one of the suggested game slice video selections is received. Based on the user selection, the game slice code can be generated and stored as has previously been described.

Figure 9A:
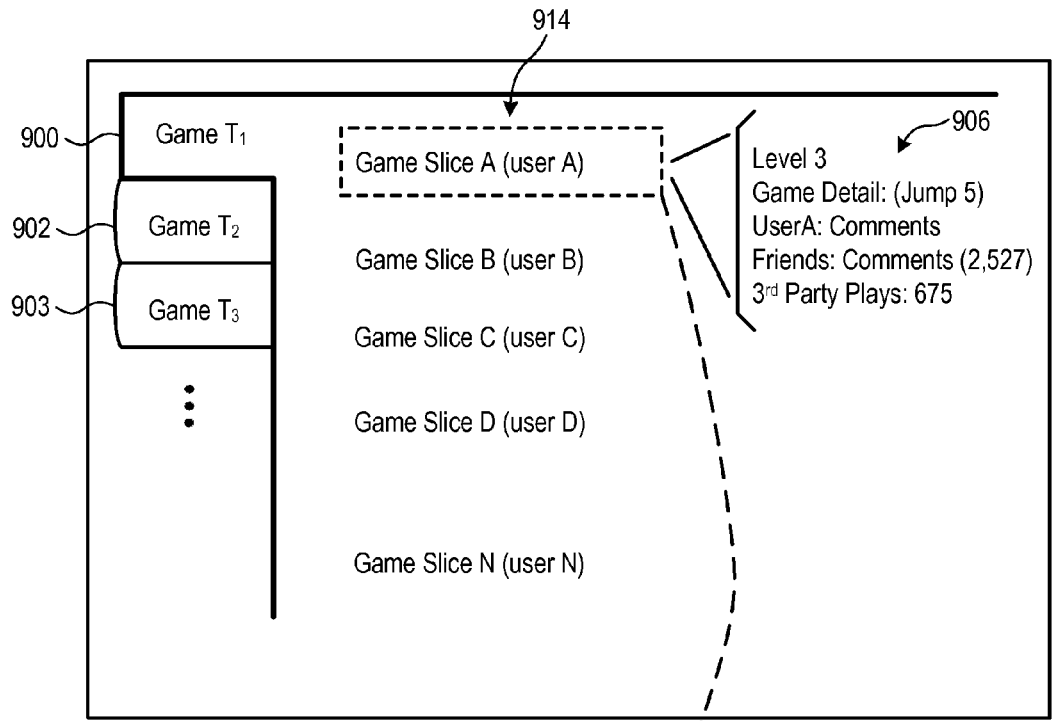
FIG. 9A illustrates an interface for browsing game slices associated with various game titles, in accordance with an embodiment of the invention.

FIG. 9A illustrates an interface for browsing game slices associated with various game titles, in accordance with an embodiment of the invention. In the illustrated embodiment, the interface is organized into a series of tabs, including tabs 900, 902, and 904, which when selected provide access to various pages corresponding to different game titles. In the illustrated embodiment, the tab 900 is currently selected, such that the presented page provides information about game slices which have been created for a particular game title T1. A game slice listing 904 lists the various game slices which have been created from the game title T1. In one embodiment, the game slice listing 904 also identifies the user who created the game slice (e.g. displaying a username of the user who created the game slice). In one embodiment, the game slice listing 904 can be browsed or navigated so as to highlight different ones of the game slices listed in the game slice listing 904. In the illustrated embodiment, a game slice A created by a user A is currently highlighted, which causes details 906 to be displayed which relate to the game slice A. The details 906 can include various kinds of information related to the game slice, such the level or stage from which the game slice was generated, a game detail which provides more specific information about the location from which the game slice was created, comments by the user A who created the game slice, a number of comments from others, a number of times the game slice has been played, or any other type of information about the game slice which can be provided when the listing of the game slice is highlighted.

Figure 9B:
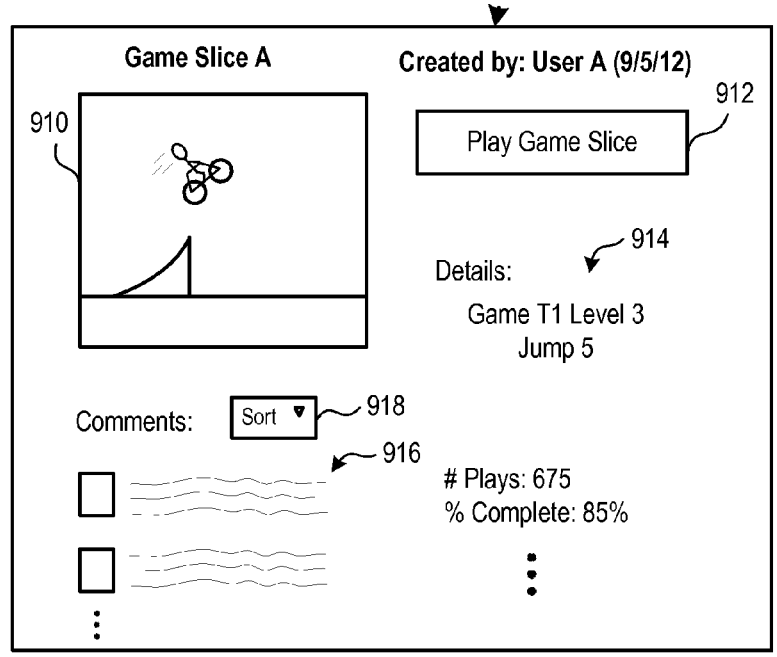
FIG. 9B illustrates a game slice information page, in accordance with an embodiment of the invention.

FIG. 9B illustrates a game slice information page, in accordance with an embodiment of the invention. The game slice information page is for the game slice A discussed with reference to FIG. 9A, and can be reached when the user selects the listing of the game slice A as shown in FIG. 9A. With continued reference to FIG. 9B, the game slice information page provides various kinds of information related to the game slice. In addition to bibliographic information about the game slice (e.g. title, username of user who created the game slice, date of creation, etc.), there may be displayed a video 910 of the game slice. In one embodiment, the video 910 is the recorded gameplay video of the original user who created the game slice. In another embodiment, the video 910 could be recorded gameplay video of other users, such as a user who achieved the highest score on the game slice, or a user who most recently played the game slice. In one embodiment, the video 910 could be a live feed of a user who is currently playing the game slice. In other embodiments, instead of a video a representative image of the game slice could be shown.

The game slice information page can further include a selectable button 912 for initiating gameplay of the game slice. The game slice information page can also include a details section 914, which can feature various details and statistical information about the game slice, such as the number of plays, the average completion rate, etc. The game slice information page may also include a comments section 916, featuring comments left by users. A sort button 918 can be provided to select various options for sorting the comments (e.g. chronological order, reverse chronological order, most popular, by rating, by relationship to the current user (e.g. comments by friends of the user in a social graph are prioritized), etc.)

Figure 10:
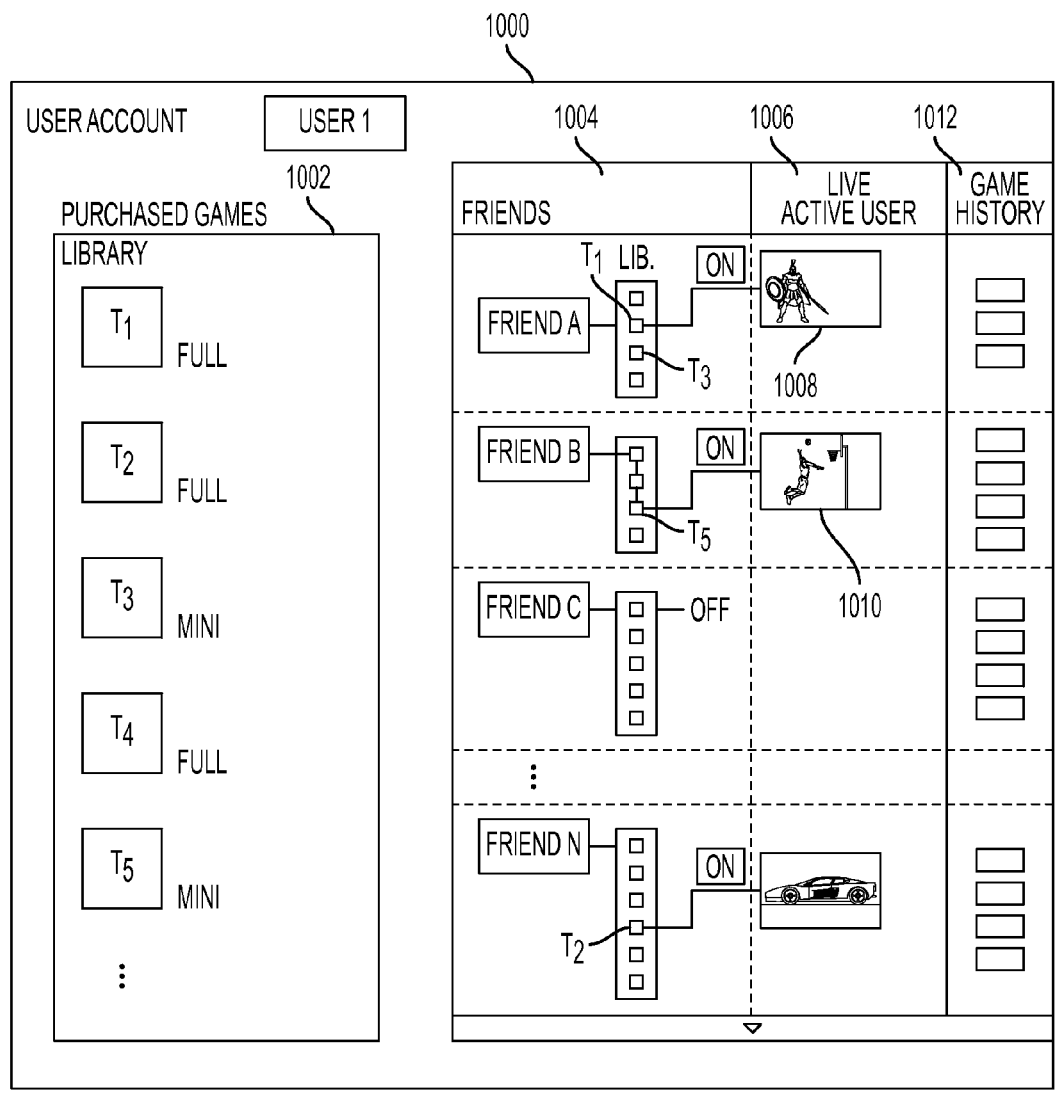
FIG. 10 illustrates a view of a user's account information, including live views of friends in a cloud gaming social network, in accordance with an embodiment of the invention.

FIG. 10 illustrates a view of a user's account information, including live views of friends in a cloud gaming social network, in accordance with an embodiment of the invention. A library section 1002 displays various game titles in the user's library. These may be game titles which the user has purchased or otherwise acquired. Display of a game title can include display of representative graphics, in addition to title information. It will be appreciated that games can be full version game titles, but can also be mini versions of limited versions, each of which may be a portion of a full version game title or be limited in some capacity as compared to the full version game title. A friends listing 1004 lists friends of the current user in a social network associated with the cloud gaming system (i.e. other users in the social graph of the current user). The social network can be a social network that is specific to the cloud gaming system, or may be (third party) social network that exists apart from the cloud gaming system, with which the cloud gaming system communicates to obtain information about the user's social graph. The friend listing 1004 can include additional information about the user's friends, such as depicting games which are owned by each friend, identifying an online status of the friend (e.g. online, offline, inactive, etc.), the friend's last login and its duration, the last game played by the friend, etc.

In one embodiment, a live active user section 1006 provides live views of the gameplay of friends who are currently online and may be playing a video game. In one embodiment, each user has an option to define whether or not to make their live gameplay available for live viewing by other users. In such an embodiment, live views are presented only from those users who have the option designated to allow their live gameplay to be viewable by other users. In the illustrated embodiment, the live active user section 1006 includes a live view 1008 of the current gameplay of a friend A, as well as a live view 1010 of the current gameplay of a friend B. In one embodiment, the current user can navigate or browse the friends of the friends listing 1004 and/or browse the live views which are available in the live active user section 1006. In one embodiment, a live view can be highlighted when the current user navigates to it, and may be rendered in a manner distinct from other live views. For example, live views might be displayed in a desaturated color scheme by default, but be displayed in a fully saturated color scheme when highlighted or selected. Live views might also be displayed at a lower resolution, framerate, or size by default, but when selected be displayed at a higher resolution, framerate, or size. In this manner, bandwidth can be allocated to a specific live view based on user selection, to present a live view that the user is interested in viewing with greater fidelity than other live views that may be active simultaneously. It should be appreciated that the live view may display not just specific gameplay of a video game, but also other activity of a friend on the cloud gaming system, such as their navigation through menus or other types of activity related to their cloud gaming session.

In one embodiment, live views are available only for those users who are currently actively engaged in gameplay of a video game. In other words, no live view of a given user is available when that user is either offline, or online but not actively engaged in gameplay of a video game. Thus, when a user is performing other non-gameplay activity on the cloud gaming system (e.g. navigating a graphical interface of the cloud gaming system while logged in to the system), such activity is not made available in a live feed for others to view. In another embodiment, the live view can include all activity of a user who is logged in to the cloud gaming system, including both gameplay of the user as well as other non-gameplay activity.

In one embodiment, the live view of a given user can be filtered so as not to expose potentially sensitive or personal information for view by others. For example, the cloud gaming system may support a chat function. As some users may wish for their chats to remain private, an option can be provided to exclude chat logs when presenting a live view. It should be appreciated that a chat function can be implemented during gameplay activity as well as during non-gameplay activity, and may be filtered out of live views of either or both of these circumstances. In another embodiment, aspects of a video game might be filtered out of a live view. For example, a user may wish to keep certain user-defined settings secret as they may confer an advantage to that user during gameplay. Thus, an option may be provided for activity related to settings to not be displayed as part of the live feed (e.g. when a user accesses a settings interface of the video game). In another embodiment, the live view can be configured to prevent viewing of personal information (e.g. preventing viewing when a user accesses a personal information page, enters payment information, enters a password, etc.).

In one embodiment, the interface provides an option to the primary user to request to join the gaming session of a secondary user who is currently online. For example, the primary user may view the secondary user's live gameplay feed and wish to join the secondary user's gameplay. In one embodiment, activation of the option sends a request to the secondary user notifying the secondary user that the primary user wishes to join their session. If the secondary accepts the request, then a multiplayer mode of the video game is initiated, facilitating multiplayer gameplay by the first and second users. In another embodiment, two or more secondary users may already be engaged in multiplayer gameplay. In such an embodiment, the primary user can send a request to join the multiplayer gameplay. Upon acceptance of the request by one of the secondary users (e.g. a designated host of the gameplay session), the primary user is able to join the multiplayer session of the video game. It should be appreciated that the aforementioned interface showing live gameplay feeds of secondary users facilitates the primary user joining the gameplay of secondary users after being able to see their gameplay.

In one embodiment, the option to request to join the gameplay of the secondary user is predicated upon determination of an ownership status of the video game by the primary user. If the primary user does not own the video game, then no option may be presented, whereas if the primary user owns the same video game as the secondary user, then the option to request to join the gameplay of the secondary user is made available as part of the interface. In one embodiment, when the primary user is determined to not be an owner of the video game, then the primary user may still join the gameplay of the secondary user in a multiplayer mode, but in a limited capacity, such as being limited in terms of duration of gameplay, available scenes/levels/stages/etc., customization options, abilities, skills, weapons, characters, vehicles, or any other aspect of the video game that may be limited. In one embodiment, following gameplay of the limited version of the video game, the primary user is provided an option to purchase the video game in full. In another embodiment, the primary user is provided an option to purchase an additional portion of the video game.

With continued reference to FIG. 10, the displayed information can also include the game history information 1012 of the user's friends. The game history information 1012 can provide information about a given friend's gameplay history, such as the most recent games played, the duration of gameplay sessions, statistics relating to the gameplay, etc.

It will be appreciated that many methods and configurations for presenting a cloud gaming interface are possible in accordance with various embodiments of the invention. In one such embodiment, a method for displaying a current gaming status of users of a cloud gaming system is provided, including the following method operations: presenting a cloud gaming interface of a primary user; determining one or more secondary users that are friends of the primary user; determining a current status of each of the secondary users, the current status being one of online or offline; for at least one online secondary user, presenting a live feed of a current gaming session of the online secondary user in the cloud gaming interface of the primary user, the live feed includes providing an option for the primary user to join the current gaming session of the online secondary user; in response to receiving a request to activate the option for the primary user to join the current gaming session of the online secondary user, initiating a multiplayer mode of the current gaming session of the online secondary user, the multiplayer mode providing for gameplay of the primary user in the current gaming session of the online secondary user; wherein initiating the multiplayer mode includes determining an ownership status of the primary user with respect to a video game defining the current gaming session of the online secondary user; wherein when the primary user is determined to own the video game, then the multiplayer mode provides for gameplay of a full version of the video game; wherein when the primary user is determined to not own the video game, then the multiplayer mode provides for gameplay of a limited version of the video game.

In one embodiment, the limited version of the video game defines a reduction, as compared to the full version of the video game, in one or more of available levels, available scenes, available features, a time limit, a virtual space, a campaign length, a number of lives, or a number of replays.

In one embodiment, the method further includes a method operation of presenting, when the video game is not owned by the primary user, an option for the primary user to purchase at least a portion of the video game.

In one embodiment, the live feed of the online secondary user is presented at a first resolution; and selection of the live feed triggers presentation of the live feed of the online secondary user at a second resolution higher than the first resolution.

In one embodiment, the live feed of the online secondary user is presented in a desaturated color mode; and selection of the live feed triggers presentation of the live feed of the online secondary user in a saturated color mode.

In one embodiment, presenting the cloud gaming interface includes presenting a library of game titles associated with each of the secondary users.

In one embodiment, determining the one or more secondary users includes accessing a social graph associated with the primary user. In one embodiment, accessing the social graph includes accessing an API of a social network.

In one embodiment, presenting the cloud gaming interface of the primary user includes presenting a listing of each of the secondary users in a priority order, the priority order based on one or more of current status, recency of login, or common ownership of games with the primary user.

Figure 11:
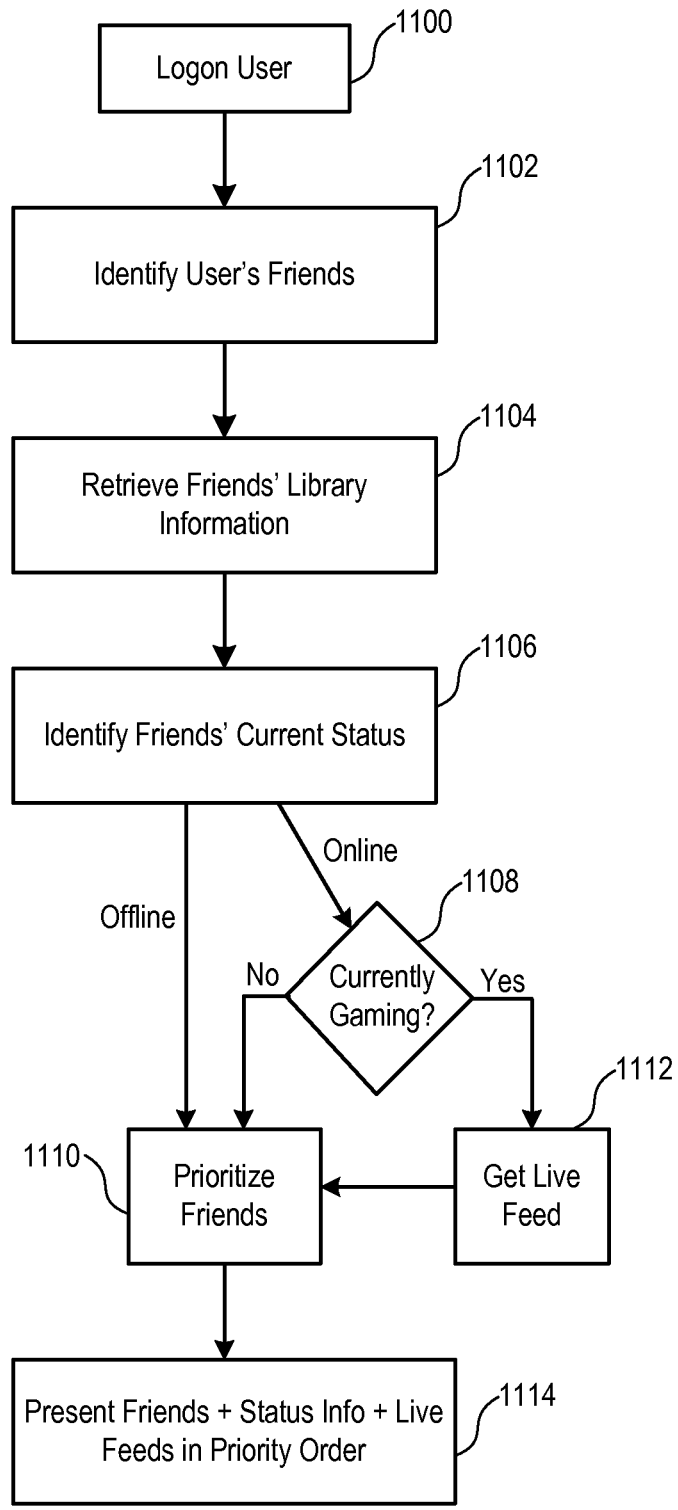
FIG. 11 illustrates a method for presenting live gameplay feeds of friends of the current user, in accordance with an embodiment of the invention.

FIG. 11 illustrates a method for presenting live gameplay feeds of friends of the current user, in accordance with an embodiment of the invention. At method operation 1100, a current user logs on to a cloud gaming system. At method operation 1102, the current user's friends are identified from a social graph of the current user. As has been noted, the social graph of the current user can be from a social network that is specific to the cloud gaming system or maybe from a social network that exists apart from the cloud gaming system. At method operation 1104, the library information of the user's friends is retrieved. The library information of the user's friends can identify game titles in the user's friends libraries. At method operation 1106, the current user's friends' current statuses are identified. If the current status of a given friend is online then at method operation 1108 it is determined whether the given friend is currently engaged in gameplay of a videogame on the cloud-based system. If so then at method operation 1112, a live gameplay feed for that user is obtained. At method operation 1110, the friends of the current user are prioritized for display based on various factors or preferences. At method operation 1114, the current user's friends and their status information and life gameplay feeds are presented in the priority order. In one embodiment, friends of the current user who are online may be prioritized over friends that are currently off-line. In one embodiment, friends of current user who are currently engaged active gameplay may be prioritized over friends that are not currently engaged in active gameplay. In one embodiment, friends having available live gameplay feeds may be prioritized over other friends. In one embodiment, friends may be prioritized based on the recency with which they have logged into the cloud gaming system. In another embodiment, friends may be prioritized based on common ownership of videogames. The foregoing examples of prioritization of friends are provided merely by way of example and not by way of limitation. It will be appreciated by those skilled in the art that in other embodiments, the current user's friends can be prioritized and presented according to the priority ordering based on any other relevant factor.

Figure 12:
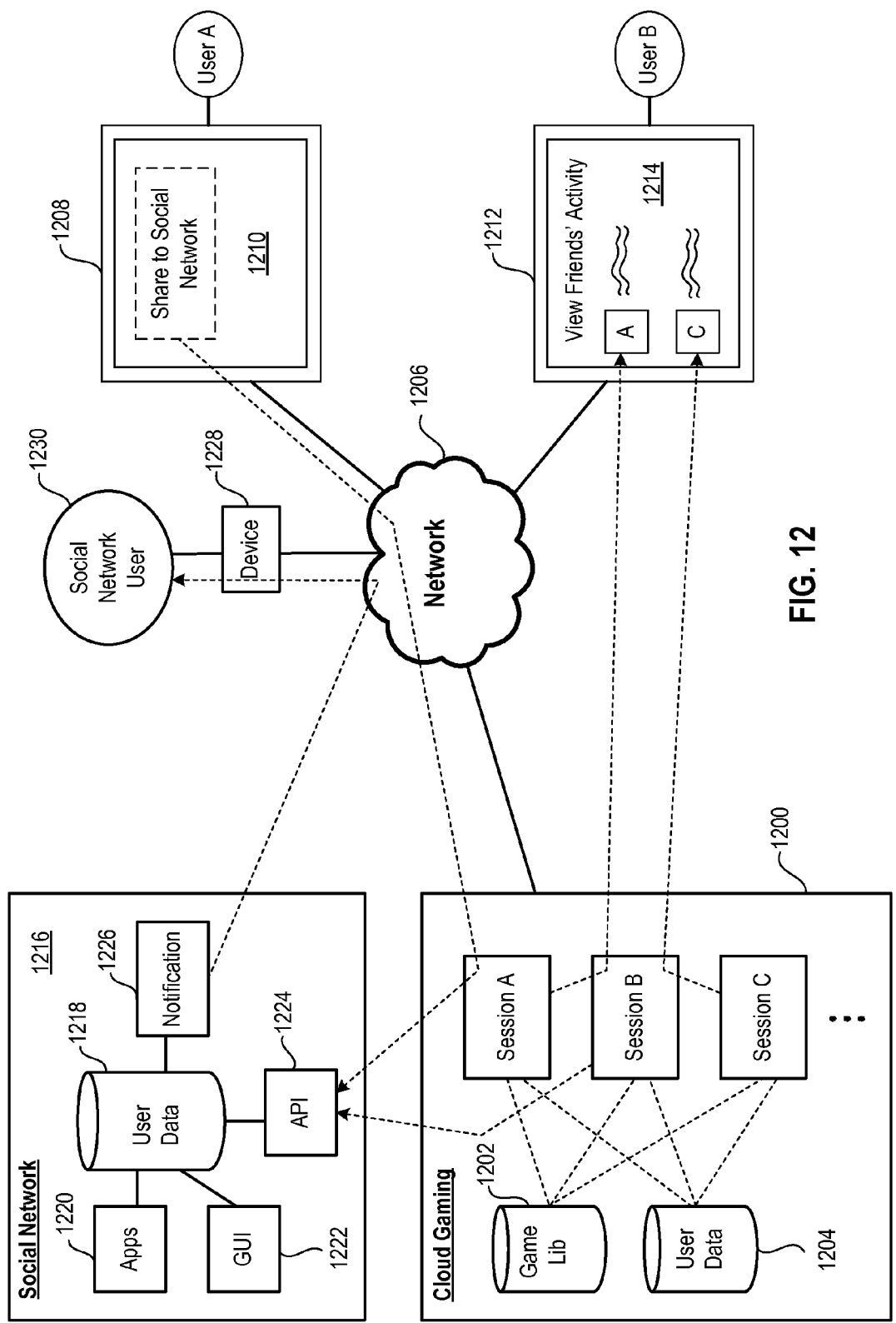
FIG. 12 illustrates a system including a cloud gaming system and a social network, in accordance with an embodiment of the invention.

FIG. 12 illustrates a system including a cloud gaming system and a social network, in accordance with an embodiment of the invention. A cloud gaming system 1200 provides access to cloud-based your games. The cloud gaming system includes a game library 1202 which contains various game titles that may be played by users. User data 1204 contains various kinds of data which are associated with users accounts, such as the game titles which are owned by a user, and any saved gameplay of the user. In the illustrated embodiment, various gameplay sessions are conceptually shown, including a session A, a session B, and a session C. The session A defines gameplay of a user A, who views the gameplay of the session A on a display 1208. The gameplay of the session A is rendered as view 1210 on user A's display 1208. Likewise, the session B defines gameplay of a user B, which is rendered on user B's device 1212 as a view 1214. In the illustrated embodiment, the view 1214 of user B's session shows an interface including live views from other users, including a live view of the session A and a live view of the session C. As gameplay from the sessions A and C proceeds, gameplay video is output from sessions A and C and can be streamed via user B's session, so as to be displayed in user B's view 1214. The gameplay video may be processed for streaming via user B's session, e.g. lowering resolution, size, framerate, color saturation, etc. to conserve bandwidth.

With continued reference to FIG. 12, a social network 1216 is also shown. The social network 1216 includes user data 1218, which includes data such as user's social graphs, posts, pictures, videos, biographical information, etc. Apps 1220 can be run on the social network platform. A graphical user interface (GUI) 1222 defines an interface for interacting with the social network. An API 1224 facilitates access to the social network. A notification module 1226 handles notification of social network users according to their preferences. As has been noted, user B's view 1214 includes live feeds from the sessions of other users. In one embodiment, user B's friends were determined based on accessing the API 1224 of the social network 1216 to determine members of user B's social graph. These members were cross-referenced against the users of the cloud gaming system to provide live gameplay feeds from friends of the user B, including feeds from the sessions A and C.

In one embodiment, the user A opts to share from his gameplay session A to his social graph. User A's session A communicates via the API 1224 to activate the notification module 1226 of the social network 1216 to send an appropriate notification to friends in the social graph of the user A. When a social network user 1230 who is in the social graph of the user A accesses the social network via a device 1228, they may see a message or posting from user A about user A's session. If set up, a user might receive notifications such as an e-mail indicating that user A has shared something on the social network. It should be appreciated that user A may share about various video game related activity, such as achievements in a video game, invitations to play a video game, comments about a video game, an invitation to view or play a game slice the user A has created, etc.

Figure 13:
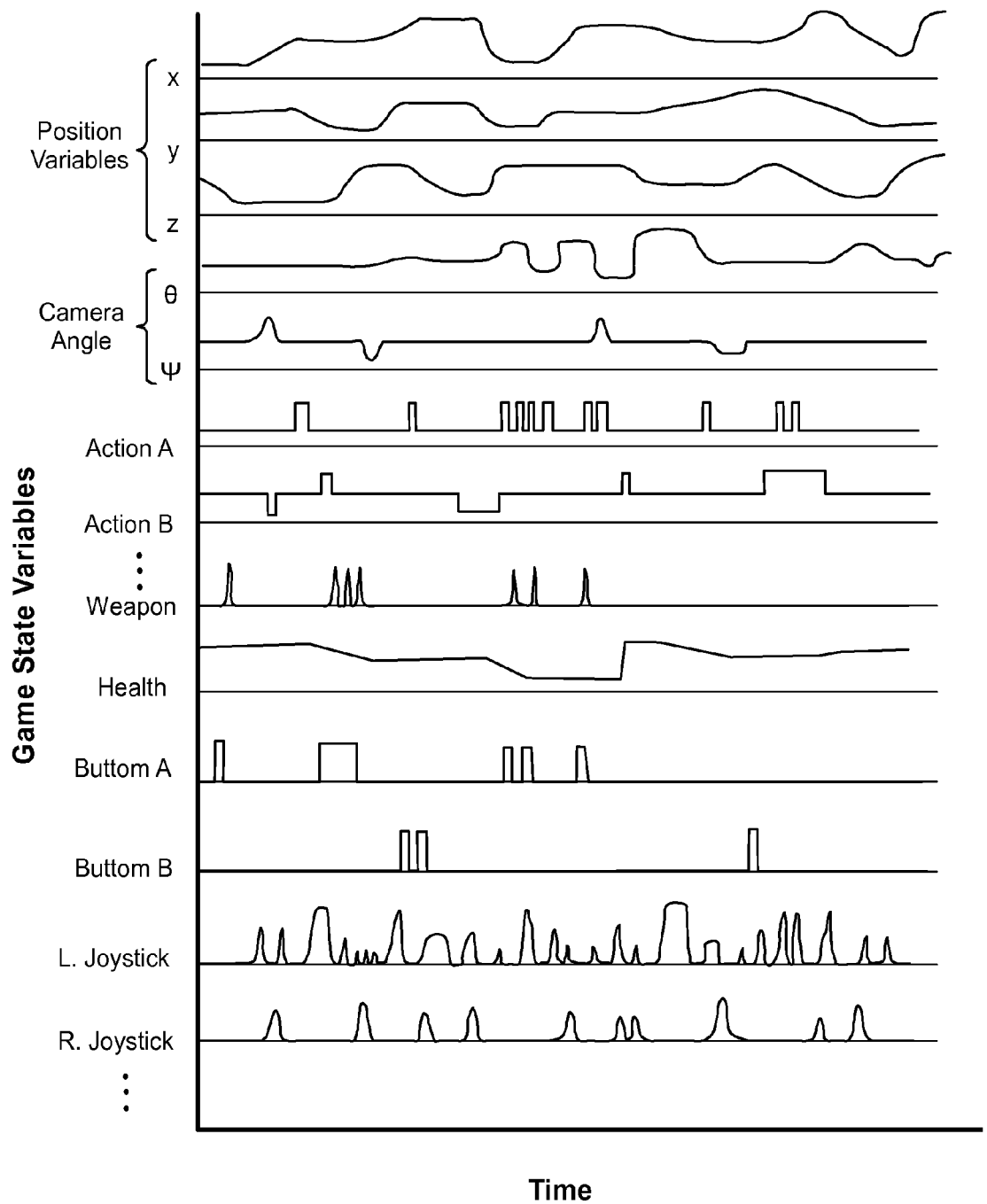
FIG. 13 is a graph illustrating various game state variables over time, in accordance with embodiments of the invention.

FIG. 13 is a graph illustrating various game state variables over time, in accordance with embodiments of the invention. It should be appreciated that in various embodiments, there can be many different kinds of game state variables that will be particular to specific video games. Those shown and described with reference to the illustrated embodiment are provided merely by way of example and not by way of limitation. The game state variables can include values which are defined by the executing video game as well as values which are defined by a user input. In the illustrated embodiment, there are position variables shown indicating the X, Y, and Z positions of an object in a virtual space of a videogame such as a character or a vehicle. Camera angle variables indicate the direction of a virtual camera or virtual view in the videogame. In one embodiment, the camera angle is defined by and azimuth component measured (e.g. along a horizontal plane) relative to and azimuth reference and an inclination component measured relative to an inclination reference (e.g. relative to vertical). Action variables such as the illustrated action A and B variables indicate the initiation and sustain of various actions within the videogame. It should be appreciated that actions for a given videogame will be specific to the context of the videogame. By way of example, actions could include the initiation of specific maneuvers, the application of skills, the triggering of modification mechanisms that modify an existing action such as increasing its level of intensity or frequency, etc., or any other type of action or activity that can be triggered by user input during the course of the videogame. With continued reference to FIG. 13, a weapon variable indicates the triggering of a weapon the videogame. A health variable indicates a level of health of, for example, a user's character in the videogame. Button variables indicate the state of buttons on a controller device, e.g. whether the button is in a depressed state or in a released statement. Joystick state variables in the illustrated embodiment indicate a magnitude of movement of a joystick relative to a neutral position. The foregoing game state variables which have been described with reference to the illustrated embodiment are merely exemplary, and it will be recognized by those skilled in the art that many other types of game state variables can be tracked over time.

With reference again to the embodiment of FIG. 6, in one embodiment, the game state analyzer 614 can be configured to analyze the game state variables of a user's recorded gameplay. Based on the analysis of the user's recorded gameplay, various regions of interest of the user's recorded gameplay can be defined and presented to the user as possible selections from which to generate a game slice. For example, a region of gameplay characterized by high levels of activity for certain game state variables might define a selection of the user's recorded gameplay. It should be appreciated that the level of activity for a given game state variable can be based on various factors such as a level of intensity, a frequency of activation, a duration of sustain, etc. In some embodiments, the analysis of the game state variables can entail searching for regions of gameplay wherein the levels of activity of two or more different game state variables are correlated in a predefined manner, e.g. the two or more variables have high levels of activity simultaneously. A high level of activity can be determined based on a predefined threshold.

In various embodiments, a region of interest of the user's recorded gameplay may be automatically determined based on threshold detection of any one or more of the following: one or more user inputs, rate of user input, frequency of input, repeats of types of inputs, occurrences of input patterns, combination inputs (e.g. combo keys), motion vectors, pressure exerted on a controller, excitation of a user (e.g. detected based on captured image or audio data of the user).

FIG. 14A illustrates a method for generating a game slice for a linear type videogame, in accordance with an embodiment of the invention. Broadly speaking, a linear videogame is one for which the progression of the player through the videogame follows a linear course, wherein in order to progress through the videogame the player must complete an earlier objective before progressing to a later objective. Thus, all players must complete the same objectives in the same order in order to progress through the videogame. Objectives in a linear videogame may be tied to both geographic as well as temporal locations within the context of a spatiotemporal storyline of the videogame. At method operation 1400, a scene of a videogame is identified. The scene can be both spatial and temporal in nature, and have various objectives defined within therein. At method operation 1402, a spatial or temporal length of the scene is defined. The length of the scene can be defined according to user input, and may also be defined based on objectives which are tied to the scene. At method operation 1404, the initial properties of items, characters, or any other objects within the scene for which properties can be assigned, is defined. At method operation 1406, a game slice is generated for the identified length of the scene having the initial properties as previously defined.

FIG. 14B illustrates a method of generating a game slice for an open world type videogame, in accordance with an embodiment of the invention. An open world videogame can be characterized as one wherein the user is at liberty to pursue any number of objectives in an order of their own choosing. Open world type video games typically also allow the user to navigate one or more virtual spaces at will. In order to progress to different levels of the videogame or complete videogame, completion of a certain set of objectives may be required, however users may be free to complete these objectives in different orderings. At method operation 1410, a location within a virtual world of the videogame is identified. At method operation 1412, a limited portion of the virtual world is defined. The limited portion of the virtual world can be defined based on user input defining a selection of recorded gameplay as has been described herein. For example, a user's gameplay in an open world videogame may range over a great variety of locations during the course of gameplay. However for purposes of generating a game slice, the user may select a portion of gameplay occurring within a limited geographic region of the virtual world of the videogame. This limited geographic region can be determined based on analysis of the user selected portion of their recorded gameplay, e.g. tracking a location of a user controlled character within the virtual world and defining boundaries which include all locations in which the character was found to exist. At method operation 1414, the initial properties of various objects, characters, items, vehicles, or any other objects found within the limited geographic region previously determined from the user's recorded gameplay selection, is defined. At method operation 1416, the game slice is generated based on the limited geographic region of the open world and the previously defined properties.

FIG. 14C illustrates a method for generating a game slice for a sports videogame, in accordance with an embodiment of the invention. The game slice can be generated based on a user defined selection of the users recorded gameplay. At method operation 1420, a setting is identified based on the selection of the user's recorded gameplay. By way of example, the setting can define a location of a sporting event, such as a court, stadium, track, or any other place setting in which a sporting event of the videogame may occur. At method operation 1422, a time period is defined based on the selection of the user's recorded gameplay. The time period defines a temporal portion for which the game slice will be generated, and can be defined based on the user's selection of recorded gameplay. The time period of the sports video game may determine certain aspects of the video game slice, such as the inclusion of special rules or activities which occur at certain time periods during a sport. At method operation 1424, the players of the game slice are determined based on the players included in the user's recorded gameplay selection. Players can include one or more characters which have been defined by the user, as well as artificial intelligence (AI) characters, which were controlled by AI character control logic of the executing video game at the time of gameplay. As has been described elsewhere herein, the actions of AI characters might be approximated in some instances. Whereas in some embodiments, the AI character control logic is defined for the game slice with the parameters as they were defined in the user's recorded gameplay selection. At method operation 1426, scene attributes for the location setting of the sports video game slice are defined. For example, these may include attributes such as weather, track or court conditions, and other attributes of the sports setting. At method operation 1428, the game slice for the video game is generated based on the aforementioned parameters.

FIG. 15 conceptually illustrates the formation of a multi-game slice game, in accordance with an embodiment of the invention. A videogame can be organized into various levels or stages. In the illustrated embodiment, a user's gameplay from various levels of a videogame are shown. Specifically, a gameplay timeline 1500 represents the user's gameplay from a first level of the videogame, whereas a gameplay timeline 1502 and a gameplay timeline 1506 represent the user's gameplay from second and third levels, respectively, of the videogame. In accordance with an embodiment of the invention, a user can concatenate multiple games slices from the videogame to form a larger multi-game slice minigame. In the illustrated embodiment, a selection 1502 from the user's gameplay timeline 1500 is utilized to define a first game slice 1514. A selection 1504 from the user's gameplay timeline 15 of two is utilized to define a second game slice 1818. And a selection 1508 from the user's gameplay timeline 1506 is utilized to define a third team slice 1522. The first, second, and third games slices are arranged in a sequential order to define the minigame 1510. In so doing, the minigame 1510 includes games slices from each of the first, second, and third levels of the videogame. In this manner, a user who plays the minigame 1510 is able to experience limited portions of multiple levels of the videogame by playing through the minigame 1510. This can be useful in providing a more compelling preview or demo of a video game than conventional game demos wherein a user can only play one portion from one level or stage of the video game. The experience is analogous to that of a movie preview, which typically provides clips from different portions of the same movie, and not just a single clip. According to embodiments of the invention, users can enjoy multi-portion game demos which provide a better sense of the scope of the full videogame, and which can feature gameplay in a continuous manner from one portion to the next.

In one embodiment, a user can insert additional material, such as a user defined video, message, images, or any other type of information, before or following a game slice. In the illustrated embodiment, an introduction 1512 is provided for introducing a player to the minigame 1510 and perhaps also introducing the player to the first game slice 1514. Additionally, a message 1516 is inserted in between the first game slice 1514 and the second game slice 1518, while another message 1520 is inserted in between the second game slice 1518 and the third game slice 1522. In one embodiment, the inserted material can include recorded gameplay video of the original user's gameplay from which the game slice was generated. If the recorded gameplay is shown before playing the game slice, the player initiating the game slice can better understand the game slice and its objectives before beginning gameplay, whereas is shown after gameplay of the game slice, the player can understand how their gameplay of the game slice compares to that of the original user.

FIG. 16 conceptually illustrates the generation of a multi-game slice minigame, in accordance with an embodiment of the invention. In the illustrated embodiment, a user's recorded gameplay timeline 1600 for a game A is shown, along with the user's recorded gameplay timeline 1604 for a game B, and the user's recorded gameplay timeline 1608 for a game C. In one embodiment, the user is able to generate a multi-game slice minigame based on game slices from different video games. In the illustrated embodiment, a selection 1602 of the user's recorded gameplay 1600 is utilized to define a game slice 1616, whereas a selection 1606 from the user's recorded gameplay 1604 is utilized to define a game slice 1620, and a selection 1610 from the users recorded gameplay 1608 is utilized to define a game slice 1624. The game slices 1616, 1620, and 1624 are sequentially arranged to define the minigame 1612. Optionally, additional material can be inserted before or following a game slice. In the illustrated embodiment, an introduction 1614 is inserted before the game slice 1616, whereas an interlude 1618 is defined between the game slice 1616 and the game slice 1620, and another interlude 1622 is defined between the game slice 1620 and the game slice 1624.

In the illustrated embodiment, it will be appreciated that the game slices are taken from different video games. This allows the user great flexibility to mix together game slices from across different game titles, genres, and even console platform generations. Merely by way of example, a user might create a minigame having game slices from each of several game titles in a singular video game series. In this manner, a player of the minigame is able to experience and appreciate the evolution of the video game series in a continuous gameplay experience.

Embodiments of the invention have generally been described with reference to cloud-based gaming systems. However, it should be appreciated by those skilled in the art that similar concepts and principles as have been described herein can be applied to traditional console-based videogame systems, possibly in conjunction with cloud-based gaming systems. For example, a user can play a console-based videogame and have the user's gameplay input data and game stayed metadata recorded during gameplay. Based on the user's gameplay input data and game state metadata, the actual gameplay output of the videogame can be regenerated at a later time. Therefore, the recorded input data and game state metadata can be utilized in conjunction with the videogame code to provide an interface for selection of a portion of the user's gameplay from which to generate a minigame, as has been described. The minigame code can be generated at the console and uploaded to a cloud system and made available for download by other users. In another embodiment, the minigame code is generated by the cloud system after receiving the selected portion of the users gameplay input data and game state metadata. The cloud system processes the selected portion of the users gameplay input data and game state metadata to generate the minigame code based on videogame code stored in the cloud system. Once generated, the minigame can be made available for cloud-based gaming wherein execution of the minigame occurs in the cloud-based system, but can also be made available for download to traditional console-based systems for execution on the console to facilitate console-based gameplay of the minigame. In this manner, minigame's can be created and played by both users of console-based video gaming systems and users of cloud-based video gaming systems.

Figure 17:
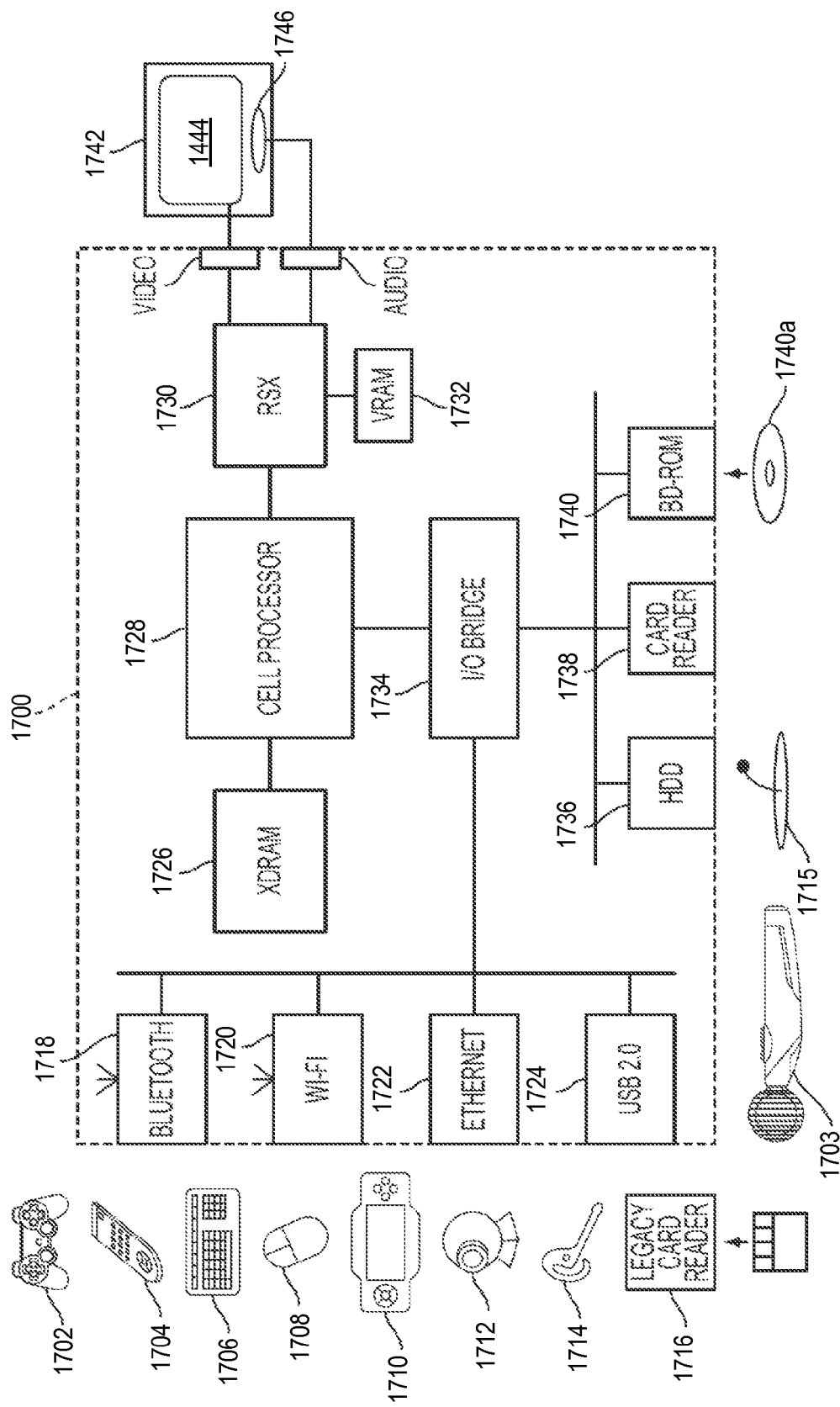
FIG. 17 illustrates hardware and user interfaces that may be used to provide interactivity with a video game, in accordance with one embodiment of the present invention.
Figure 18:
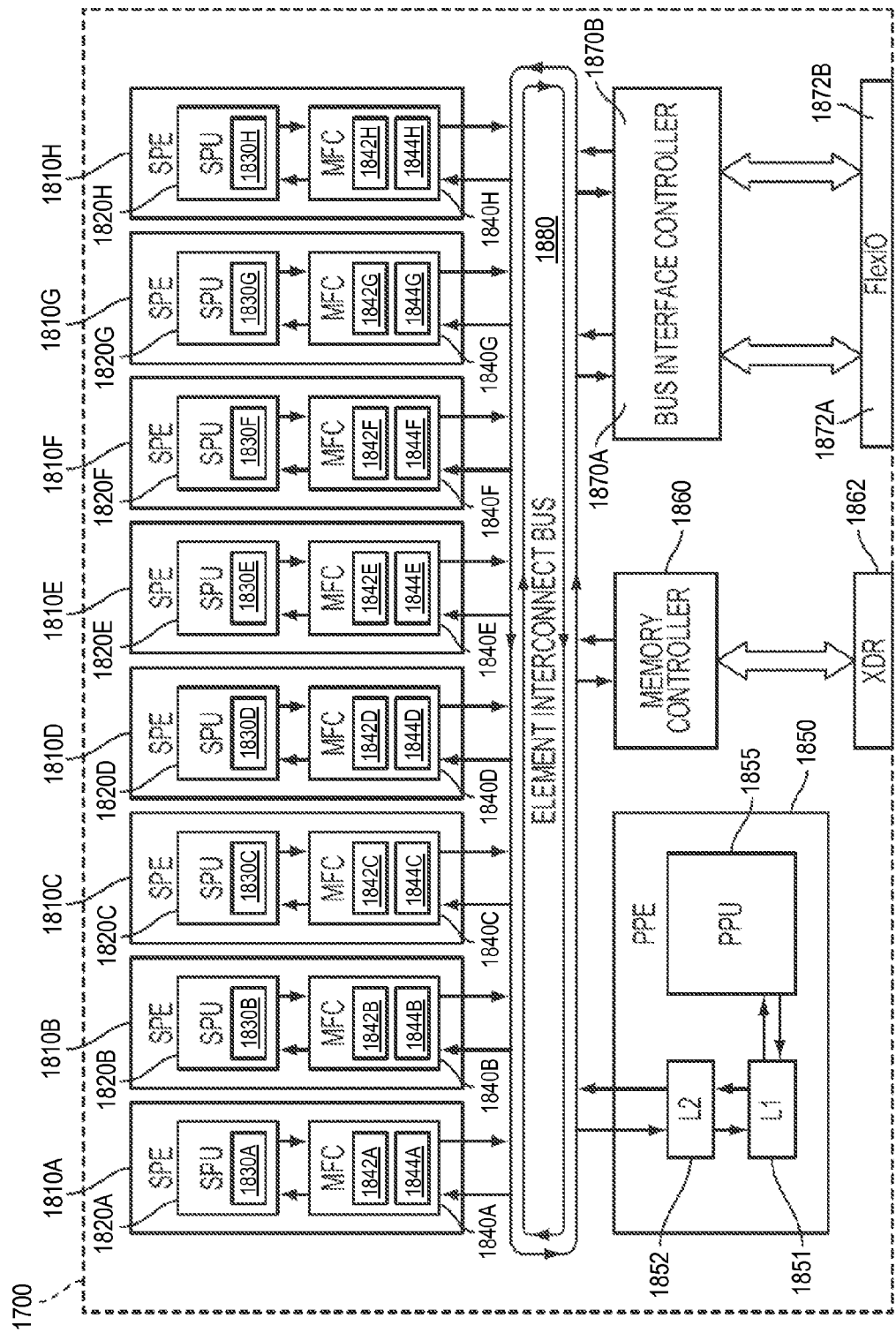
FIG. 18 illustrates additional hardware that may be used to process instructions, in accordance with one embodiment of the present invention.

FIG. 17 illustrates hardware and user interfaces that may be used to provide interactivity with a video game, in accordance with one embodiment of the present invention. FIG. 17 schematically illustrates the overall system architecture of the Sony® Playstation 3® entertainment device, a console that may be compatible for interfacing a control device with a computer program executing at a base computing device in accordance with embodiments of the present invention. A system unit 1700 is provided, with various peripheral devices connectable to the system unit 1700. The system unit 1700 comprises: a Cell processor 1728; a Rambus® dynamic random access memory (XDRAM) unit 1726; a Reality Synthesizer graphics unit 1730 with a dedicated video random access memory (VRAM) unit 1732; and an I/O bridge 1734. The system unit 1700 also comprises a Blu Ray® Disk BD-ROM® optical disk reader 1740 for reading from a disk 1740a and a removable slot-in hard disk drive (HDD) 1736, accessible through the I/O bridge 1734. Optionally the system unit 1700 also comprises a memory card reader 1738 for reading compact flash memory cards, Memory Stick® memory cards and the like, which is similarly accessible through the I/O bridge 1734.

The I/O bridge 1734 also connects to six Universal Serial Bus (USB) 2.0 ports 1724; a gigabit Ethernet port 1722; an IEEE 802.11b/g wireless network (Wi-Fi) port 1720; and a Bluetooth® wireless link port 1718 capable of supporting up to seven Bluetooth connections.

In operation, the I/O bridge 1734 handles all wireless, USB and Ethernet data, including data from one or more game controllers 1702-1703. For example when a user is playing a game, the I/O bridge 1734 receives data from the game controller 1702-1703 via a Bluetooth link and directs it to the Cell processor 1728, which updates the current state of the game accordingly.

The wireless, USB and Ethernet ports also provide connectivity for other peripheral devices in addition to game controllers 1702-1703, such as: a remote control 1704; a keyboard 1706; a mouse 1708; a portable entertainment device 1710 such as a Sony Playstation Portable® entertainment device; a video camera such as an EyeToy® video camera 1712; a microphone headset 1714; and a microphone 1715. Such peripheral devices may therefore in principle be connected to the system unit 1700 wirelessly; for example the portable entertainment device 1710 may communicate via a Wi-Fi ad-hoc connection, whilst the microphone headset 1714 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 1716 may be connected to the system unit via a USB port 1724, enabling the reading of memory cards 1748 of the kind used by the Playstation® or Playstation 2® devices.

The game controllers 1702-1703 are operable to communicate wirelessly with the system unit 1700 via the Bluetooth link, or to be connected to a USB port, thereby also providing power by which to charge the battery of the game controllers 1702-1703. Game controllers 1702-1703 can also include memory, a processor, a memory card reader, permanent memory such as flash memory, light emitters such as an illuminated spherical section, LEDs, or infrared lights, microphone and speaker for ultrasound communications, an acoustic chamber, a digital camera, an internal clock, a recognizable shape such as the spherical section facing the game console, and wireless communications using protocols such as Bluetooth®, WiFi™, etc.

Game controller 1702 is a controller designed to be used with two hands, and game controller 1703 is a single-hand controller with an attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands. Optionally, other wirelessly enabled peripheral devices such as the Playstation™ Portable device may be used as a controller. In the case of the Playstation™ Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 1704 is also operable to communicate wirelessly with the system unit 1700 via a Bluetooth link. The remote control 704 comprises controls suitable for the operation of the Blu Ray™ Disk BD-ROM reader 1740 and for the navigation of disk content.

The Blu Ray™ Disk BD-ROM reader 1740 is operable to read CD-ROMs compatible with the Playstation and PlayStation 2 devices, in addition to conventional pre-recorded and recordable CDs, and so-called Super Audio CDs. The reader 1740 is also operable to read DVD-ROMs compatible with the Playstation 2 and PlayStation 3 devices, in addition to conventional pre-recorded and recordable DVDs. The reader 1740 is further operable to read BD-ROMs compatible with the Playstation 3 device, as well as conventional pre-recorded and recordable Blu-Ray Disks.

The system unit 1700 is operable to supply audio and video, either generated or decoded by the Playstation 3 device via the Reality Synthesizer graphics unit 1730, through audio and video connectors to a display and sound output device 1742 such as a monitor or television set having a display 1744 and one or more loudspeakers 1746. The audio connectors 1750 may include conventional analogue and digital outputs whilst the video connectors 1752 may variously include component video, S-video, composite video and one or more High Definition Multimedia Interface (HDMI) outputs. Consequently, video output may be in formats such as PAL or NTSC, or in 720p, 1080i or 1080p high definition.

Audio processing (generation, decoding and so on) is performed by the Cell processor 1728. The Playstation 3 device's operating system supports Dolby® 5.1 surround sound, Dolby® Theatre Surround (DTS), and the decoding of 7.1 surround sound from Blu-Ray® disks.

In the present embodiment, the video camera 1712 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 1700. The camera LED indicator is arranged to illuminate in response to appropriate control data from the system unit 1700, for example to signify adverse lighting conditions. Embodiments of the video camera 1712 may variously connect to the system unit 700 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs. In another embodiment the camera is an infrared camera suitable for detecting infrared light.

In general, in order for successful data communication to occur with a peripheral device such as a video camera or remote control via one of the communication ports of the system unit 1700, an appropriate piece of software such as a device driver should be provided. Device driver technology is well-known and will not be described in detail here, except to say that the skilled man will be aware that a device driver or similar software interface may be required in the present embodiment described.

FIG. 12 illustrates additional hardware that may be used to process instructions, in accordance with one embodiment of the present invention. Cell processor 1728 has an architecture comprising four basic components: external input and output structures comprising a memory controller 1860 and a dual bus interface controller 1870A, B; a main processor referred to as the Power Processing Element 1850; eight co-processors referred to as Synergistic Processing Elements (SPEs) 1810A-H; and a circular data bus connecting the above components referred to as the Element Interconnect Bus 880. The total floating point performance of the Cell processor is 218 GFLOPS, compared with the 6.2 GFLOPs of the Playstation 2 device's Emotion Engine.

The Power Processing Element (PPE) 1850 is based upon a two-way simultaneous multithreading Power 570 compliant PowerPC core (PPU) 855 running with an internal clock of 3.2 GHz. It comprises a 512 kB level 2 (L2) cache and a 32 kB level 1 (L1) cache. The PPE 1850 is capable of eight single position operations per clock cycle, translating to 25.6 GFLOPs at 3.2 GHz. The primary role of the PPE 1850 is to act as a controller for the Synergistic Processing Elements 1810A-H, which handle most of the computational workload. In operation the PPE 1850 maintains a job queue, scheduling jobs for the Synergistic Processing Elements 1810A-H and monitoring their progress. Consequently each Synergistic Processing Element 1810A-H runs a kernel whose role is to fetch a job, execute it and synchronized with the PPE 1850.

Each Synergistic Processing Element (SPE) 1810A-H comprises a respective Synergistic Processing Unit (SPU) 1820A-H, and a respective Memory Flow Controller (MFC) 1840A-H comprising in turn a respective Dynamic Memory Access Controller (DMAC) 1842A-H, a respective Memory Management Unit (MMU) 1844A-H and a bus interface (not shown). Each SPU 1820A-H is a RISC processor clocked at 3.2 GHz and comprising 256 kB local RAM 1830A-H, expandable in principle to 4 GB. Each SPE gives a theoretical 25.6 GFLOPS of single precision performance. An SPU can operate on 4 single precision floating point members, 4 32-bit numbers, 8 16-bit integers, or 16 8-bit integers in a single clock cycle. In the same clock cycle it can also perform a memory operation. The SPU 1820A-H does not directly access the system memory XDRAM 726; the 64-bit addresses formed by the SPU 1820A-H are passed to the MFC 1840A-H which instructs its DMA controller 1842A-H to access memory via the Element Interconnect Bus 1880 and the memory controller 1860.

The Element Interconnect Bus (EIB) 1880 is a logically circular communication bus internal to the Cell processor 1728 which connects the above processor elements, namely the PPE 1850, the memory controller 1860, the dual bus interface 1870A,B and the 8 SPEs 1810A-H, totaling 12 participants. Participants can simultaneously read and write to the bus at a rate of 8 bytes per clock cycle. As noted previously, each SPE 1810A-H comprises a DMAC 1842A-H for scheduling longer read or write sequences. The EIB comprises four channels, two each in clockwise and anti-clockwise directions. Consequently for twelve participants, the longest step-wise data-flow between any two participants is six steps in the appropriate direction. The theoretical peak instantaneous EIB bandwidth for 12 slots is therefore 96B per clock, in the event of full utilization through arbitration between participants. This equates to a theoretical peak bandwidth of 307.2 GB/s (gigabytes per second) at a clock rate of 3.2 GHz.

The memory controller 1860 comprises an XDRAM interface 1862, developed by Rambus Incorporated. The memory controller interfaces with the Rambus XDRAM 726 with a theoretical peak bandwidth of 25.6 GB/s.

The dual bus interface 1870A,B comprises a Rambus FlexIO® system interface 1872A,B. The interface is organized into 12 channels each being 8 bits wide, with five paths being inbound and seven outbound. This provides a theoretical peak bandwidth of 62.4 GB/s (36.4 GB/s outbound, 26 GB/s inbound) between the Cell processor and the I/O Bridge 734 via controller 1870A and the Reality Simulator graphics unit 1730 via controller 1870B.

Data sent by the Cell processor 1728 to the Reality Simulator graphics unit 1730 will typically comprise display lists, being a sequence of commands to draw vertices, apply textures to polygons, specify lighting conditions, and so on.

Figure 19:
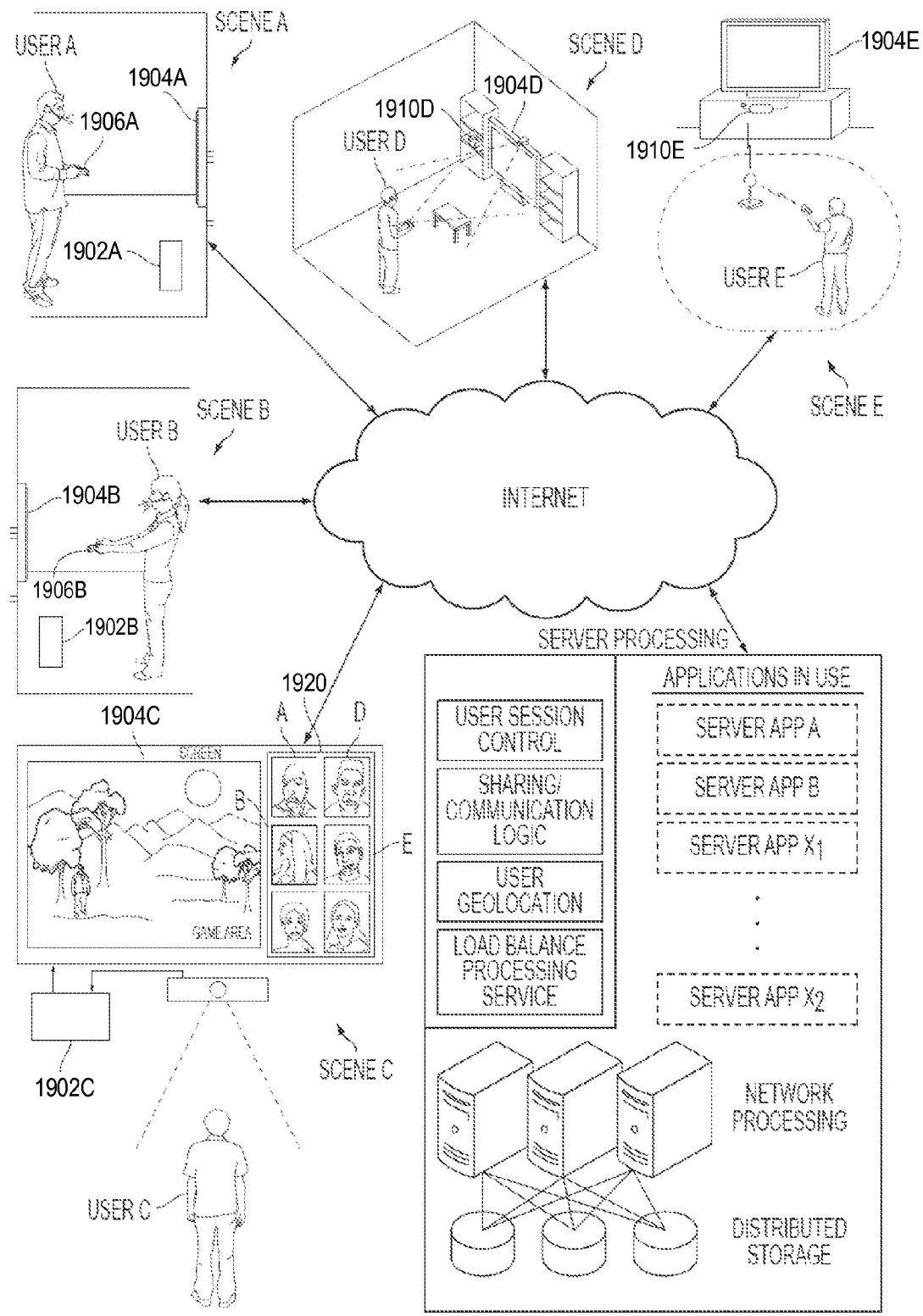
FIG. 19 is an exemplary illustration of scene A through scene E with respective user A through user E interacting with game clients 1102 that are connected to server processing via the internet, in accordance with one embodiment of the present invention.

FIG. 19 is an exemplary illustration of scene A through scene E with respective user A through user E interacting with game clients 1902 that are connected to server processing via the internet, in accordance with one embodiment of the present invention. A game client is a device that allows users to connect to server applications and processing via the internet. The game client allows users to access and playback online entertainment content such as but not limited to games, movies, music and photos. Additionally, the game client can provide access to online communications applications such as VOIP, text chat protocols, and email.

A user interacts with the game client via controller. In some embodiments the controller is a game client specific controller while in other embodiments, the controller can be a keyboard and mouse combination. In one embodiment, the game client is a standalone device capable of outputting audio and video signals to create a multimedia environment through a monitor/television and associated audio equipment. For example, the game client can be, but is not limited to a thin client, an internal PCI-express card, an external PCI-express device, an ExpressCard device, an internal, external, or wireless USB device, or a Firewire device, etc. In other embodiments, the game client is integrated with a television or other multimedia device such as a DVR, Blu-Ray player, DVD player or multi-channel receiver.

Within scene A of FIG. 13, user A interacts with a client application displayed on a monitor 1904A using a controller 1906A paired with game client 1902A. Similarly, within scene B, user B interacts with another client application that is displayed on monitor 1904B using a controller 1906B paired with game client 1902B. Scene C illustrates a view from behind user C as he looks at a monitor displaying a game and buddy list from the game client 1902C. While FIG. 13 shows a single server processing module, in one embodiment, there are multiple server processing modules throughout the world. Each server processing module includes sub-modules for user session control, sharing/communication logic, user geo-location, and load balance processing service. Furthermore, a server processing module includes network processing and distributed storage.

When a game client 1902 connects to a server processing module, user session control may be used to authenticate the user. An authenticated user can have associated virtualized distributed storage and virtualized network processing. Examples items that can be stored as part of a user's virtualized distributed storage include purchased media such as, but not limited to games, videos and music etc. Additionally, distributed storage can be used to save game status for multiple games, customized settings for individual games, and general settings for the game client. In one embodiment, the user geo-location module of the server processing is used to determine the geographic location of a user and their respective game client. The user's geographic location can be used by both the sharing/communication logic and the load balance processing service to optimize performance based on geographic location and processing demands of multiple server processing modules. Virtualizing either or both network processing and network storage would allow processing tasks from game clients to be dynamically shifted to underutilized server processing module(s). Thus, load balancing can be used to minimize latency associated with both recall from storage and with data transmission between server processing modules and game clients.

The server processing module has instances of server application A and server application B. The server processing module is able to support multiple server applications as indicated by server application $X_1$ and server application $X_2$. In one embodiment, server processing is based on cluster computing architecture that allows multiple processors within a cluster to process server applications. In another embodiment, a different type of multi-computer processing scheme is applied to process the server applications. This allows the server processing to be scaled in order to accommodate a larger number of game clients executing multiple client applications and corresponding server applications. Alternatively, server processing can be scaled to accommodate increased computing demands necessitated by more demanding graphics processing or game, video compression, or application complexity. In one embodiment, the server processing module performs the majority of the processing via the server application. This allows relatively expensive components such as graphics processors, RAM, and general processors to be centrally located and reduces to the cost of the game client. Processed server application data is sent back to the corresponding game client via the internet to be displayed on a monitor.

Scene C illustrates an exemplary application that can be executed by the game client and server processing module. For example, in one embodiment game client 1902C allows user C to create and view a buddy list 1920 that includes user A, user B, user D and user E. As shown, in scene C, user C is able to see either real time images or avatars of the respective user on monitor 1904C. Server processing executes the respective applications of game client 1902C and with the respective game clients 1902 of users A, user B, user D and user E. Because the server processing is aware of the applications being executed by game client B, the buddy list for user A can indicate which game user B is playing. Further still, in one embodiment, user A can view actual in game video directly from user B. This is enabled by merely sending processed server application data for user B to game client A in addition to game client B.

In addition to being able to view video from buddies, the communication application can allow real-time communications between buddies. As applied to the previous example, this allows user A to provide encouragement or hints while watching real-time video of user B. In one embodiment two-way real time voice communication is established through a client/server application. In another embodiment, a client/server application enables text chat. In still another embodiment, a client/server application converts speech to text for display on a buddy's screen.

Scene D and scene E illustrate respective user D and user E interacting with game consoles 1910D and 1910E respectively. Each game console 1910D and 1910E are connected to the server processing module and illustrate a network where the server processing modules coordinates game play for both game consoles and game clients.

Figure 20:
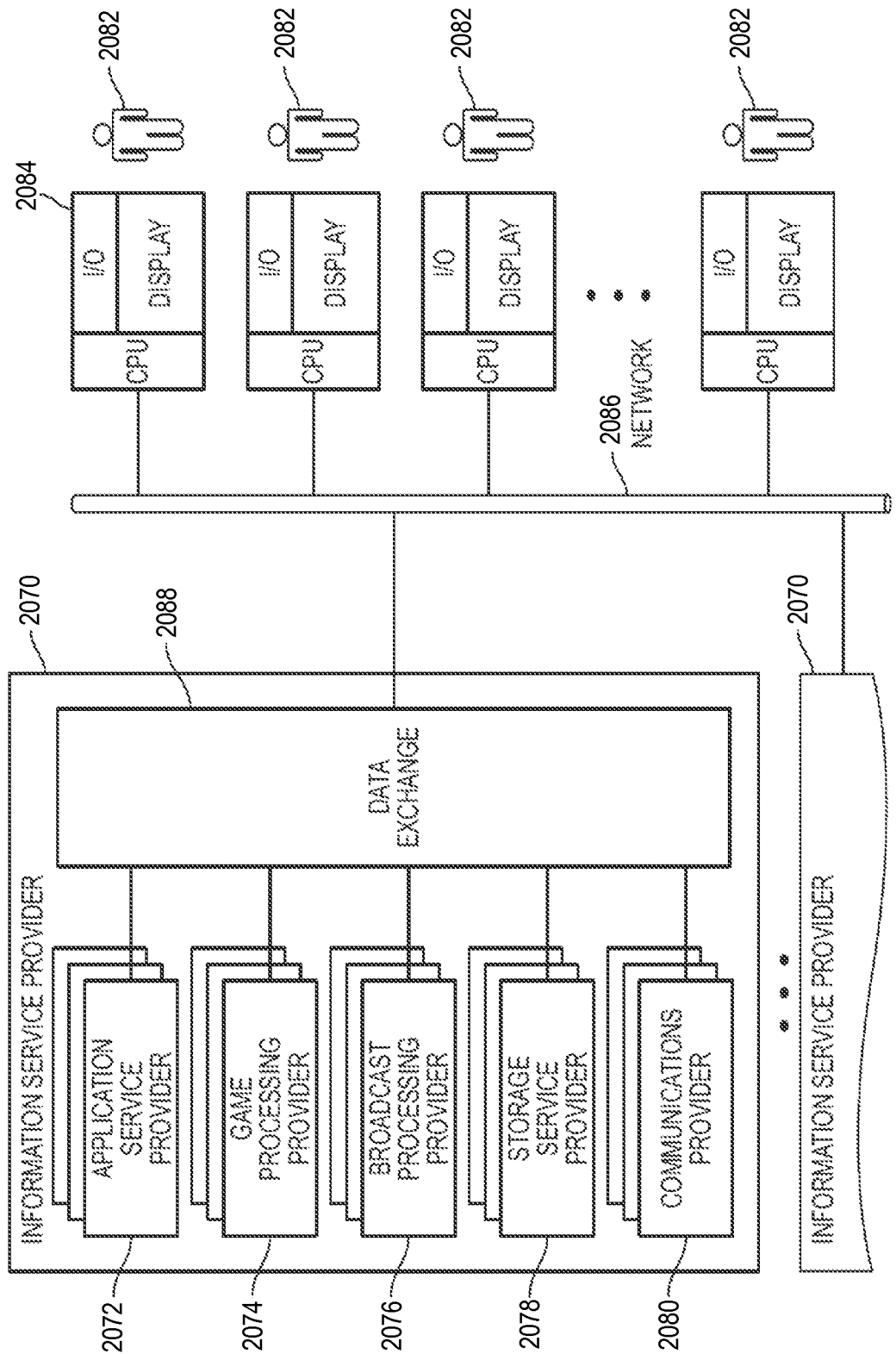
FIG. 20 illustrates an embodiment of an Information Service Provider architecture.

FIG. 20 illustrates an embodiment of an Information Service Provider architecture. Information Service Providers (ISP) 2070 delivers a multitude of information services to users 2082 geographically dispersed and connected via network 2086. An ISP can deliver just one type of service, such as stock price updates, or a variety of services such as broadcast media, news, sports, gaming, etc. Additionally, the services offered by each ISP are dynamic, that is, services can be added or taken away at any point in time. Thus, the ISP providing a particular type of service to a particular individual can change over time. For example, a user may be served by an ISP in near proximity to the user while the user is in her home town, and the user may be served by a different ISP when the user travels to a different city. The home-town ISP will transfer the required information and data to the new ISP, such that the user information "follows" the user to the new city making the data closer to the user and easier to access. In another embodiment, a master-server relationship may be established between a master ISP, which manages the information for the user, and a server ISP that interfaces directly with the user under control from the master ISP. In other embodiment, the data is transferred from one ISP to another ISP as the client moves around the world to make the ISP in better position to service the user be the one that delivers these services.

ISP 2070 includes Application Service Provider (ASP) 2072, which provides computer-based services to customers over a network. Software offered using an ASP model is also sometimes called on-demand software or software as a service (SaaS). A simple form of providing access to a particular application program (such as customer relationship management) is by using a standard protocol such as HTTP. The application software resides on the vendor's system and is accessed by users through a web browser using HTML, by special purpose client software provided by the vendor, or other remote interface such as a thin client.

Services delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the Internet, based on how the Internet is depicted in computer network diagrams and is an abstraction for the complex infrastructure it conceals.

Further, ISP 2070 includes a Game Processing Server (GPS) 2074 which is used by game clients to play single and multiplayer video games. Most video games played over the Internet operate via a connection to a game server. Typically, games use a dedicated server application that collects data from players and distributes it to other players. This is more efficient and effective than a peer-to-peer arrangement, but it requires a separate server to host the server application. In another embodiment, the GPS establishes communication between the players and their respective game-playing devices exchange information without relying on the centralized GPS.

Dedicated GPSs are servers which run independently of the client. Such servers are usually run on dedicated hardware located in data centers, providing more bandwidth and dedicated processing power. Dedicated servers are the preferred method of hosting game servers for most PC-based multiplayer games. Massively multiplayer online games run on dedicated servers usually hosted by the software company that owns the game title, allowing them to control and update content.

Broadcast Processing Server (BPS) 2076 distributes audio or video signals to an audience. Broadcasting to a very narrow range of audience is sometimes called narrowcasting. The final leg of broadcast distribution is how the signal gets to the listener or viewer, and it may come over the air as with a radio station or TV station to an antenna and receiver, or may come through cable TV or cable radio (or "wireless cable") via the station or directly from a network. The Internet may also bring either radio or TV to the recipient, especially with multicasting allowing the signal and bandwidth to be shared. Historically, broadcasts have been delimited by a geographic region, such as national broadcasts or regional broadcast. However, with the proliferation of fast internet, broadcasts are not defined by geographies as the content can reach almost any country in the world.

Storage Service Provider (SSP) 2078 provides computer storage space and related management services. SSPs also offer periodic backup and archiving. By offering storage as a service, users can order more storage as required. Another major advantage is that SSPs include backup services and users will not lose all their data if their computers' hard drives fail. Further, a plurality of SSPs can have total or partial copies of the user data, allowing users to access data in an efficient way independently of where the user is located or the device being used to access the data. For example, a user can access personal files in the home computer, as well as in a mobile phone while the user is on the move.

Communications Provider 380 provides connectivity to the users. One kind of Communications Provider is an Internet Service Provider (ISP) which offers access to the Internet. The ISP connects its customers using a data transmission technology appropriate for delivering Internet Protocol datagrams, such as dial-up, DSL, cable modem, wireless or dedicated high-speed interconnects. The Communications Provider can also provide messaging services, such as e-mail, instant messaging, and SMS texting. Another type of Communications Provider is the Network Service provider (NSP) which sells bandwidth or network access by providing direct backbone access to the Internet. Network service providers may consist of telecommunications companies, data carriers, wireless communications providers, Internet service providers, cable television operators offering high-speed Internet access, etc.

Data Exchange 2088 interconnects the several modules inside ISP 2070 and connects these modules to users 2082 via network 2086. Data Exchange 2088 can cover a small area where all the modules of ISP 2070 are in close proximity, or can cover a large geographic area when the different modules are geographically dispersed. For example, Data Exchange 2088 can include a fast Gigabit Ethernet (or faster) within a cabinet of a data center, or an intercontinental virtual area network (VLAN).

Users 2082 access the remote services with client device 2084, which includes at least a CPU, a display and I/O. The client device can be a PC, a mobile phone, a netbook, a PDA, etc. In one embodiment, ISP 2070 recognizes the type of device used by the client and adjusts the communication method employed. In other cases, client devices use a standard communications method, such as html, to access ISP 2070.

Embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention can employ various computer-implemented operations involving data stored in computer systems. These operations are those requiring physical manipulation of physical quantities. Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for generating a playable game slice of a video game, comprising:
   recording, by a cloud gaming system that includes at least one server computer, a user's gameplay of the video game, wherein recording the user's gameplay includes recording one or more of user input data received over a network from a first client device, or game state data generated by processing the user input data by a video game processor of the cloud gaming system;
   analyzing, by a game state analyzer of the cloud gaming system, the user's recorded gameplay to determine a region of interest, wherein analyzing the user's recorded gameplay includes determining levels of activity of the user input data or game state data, the region of interest being a region having levels of activity that exceed a predefined threshold;
   defining, by a break point processor of the cloud gaming system, boundaries within a gameplay context of the video game based on the determined region of interest that define options for selection of a beginning and an end for the playable game slice; and
   generating, by a game slice generator of the cloud gaming system, the playable game slice of the video game based on the selection defined from the boundaries, the playable game slice of the video game being a portion of the video game, the playable game slice being configured for interactive gameplay as defined by the selected beginning and end;
   sharing the playable game slice of the video game over the network to one or more additional client devices for interactive gameplay by one or more additional users;
   wherein the method is executed by a processor.

2. The method of claim 1, wherein defining boundaries within a gameplay context of the video game includes defining a spatial boundary within a virtual space of the video game.

3. The method of claim 2, wherein the spatial boundary within the virtual space of the video game defines a portion of the virtual space less than an entirety of the virtual space, the portion of the virtual space having a subset of features of the virtual space.

4. The method of claim 1, wherein defining boundaries within a gameplay context of the video game includes one or more of, defining a temporal boundary within a temporal context of the video game, or identifying a nearest start point or a nearest end point of one or more of a stage, level, or scene.

5. The method of claim 1,
   wherein analyzing the user's recorded gameplay includes determining user game state settings based on the user's recorded gameplay; and
   wherein generating the playable game slice of the video game includes defining the playable game slice of the video game to have initial game state settings based on the determined user game state settings.

6. The method of claim 1, wherein the region of interest is automatically identified based on correspondence to one or more thresholds.

7. The method of claim 6, wherein at least one of said thresholds is associated to one or more of user inputs, a rate of user input, a frequency of user input, repeats of a user input, an input pattern, sharing of the gameplay context with other users, posting of comments associated with the gameplay on a social network, or popularity of portions of the video game based on social network sharing levels.

8. The method of claim 1, wherein the break point processor is configured to determine breakpoints that define the boundaries based on one or more of geography, time, task accomplishment, goal accomplishment, a physical scene boundary, or a temporal scene boundary.

9. The method of claim 1, further comprising:
   executing the video game by the video game processor to generate video data;
   transmitting the video data over the network from the cloud gaming system to the first client device for rendering to a display by the first client device.

10. The method of claim 9, wherein the first client device is configured to generate the user input data from user interactivity with the rendered video data detected through one or more peripheral devices.

11. A method for generating a playable game slice of a video game, comprising:
    recording, by a cloud gaming system that includes at least one server computer, a user's gameplay of the video game;
    analyzing, by a game state analyzer of the cloud gaming system, the user's recorded gameplay to determine one or more regions of interest;
    presenting each of the regions of interest for selection;
    receiving a selection input indicating a selected region of interest;
    for the selected region of interest, defining, by a break point processor of the cloud gaming system, boundaries within a gameplay context of the video game based on the selected region of interest to define a beginning and an end for the playable game slice; and
    generating, by a game slice generator of the cloud gaming system, the playable game slice of the video game based on the defined boundaries, the playable game slice of the video game being a portion of the video game, the playable game slice being configured for interactive gameplay as defined by the beginning and end;
    sharing the playable game slice of the video game on an information page communicated over the network to one or more client devices for interactive gameplay by one or more additional users;
    wherein the method is executed by a processor.

12. The method of claim 11,
    wherein recording the user's gameplay includes recording one or more of user input data or game state data.

13. The method of claim 12, wherein analyzing the user's recorded gameplay includes determining levels of activity of the user input data or game state data, each region of interest being a region having levels of activity that exceed a predefined threshold.

14. The method of claim 11,
    wherein analyzing the user's recorded gameplay includes determining user game state settings based on the user's recorded gameplay; and
    wherein generating the playable game slice of the video game includes defining the playable game slice of the video game to have initial game state settings based on the determined user game state settings.

15. The method of claim 11, wherein each region of interest is automatically identified based on correspondence to one or more thresholds.

16. A method for generating a playable game slice of a video game, comprising:
- recording, by a cloud gaming system that includes at least one server computer, a user's gameplay of a full version of the video game, wherein recording the user's gameplay includes recording one or more of user input data received over a network from a first client device, or game state data generated by processing the user input data by a video game processor of the cloud gaming system;
- analyzing, by a game state analyzer of the cloud gaming system, the user's recorded gameplay to determine one or more regions of interest, wherein each region of interest is automatically identified based on correspondence to one or more thresholds;
- presenting each of the regions of interest for selection;
- receiving a selection input indicating a selected region of interest;
- for the selected region of interest, defining, by a breakpoint processor of the cloud gaming system, boundaries within a gameplay context of the video game for the playable game slice based on the selected region of interest;
- generating, by a game slice generator of the cloud gaming system, the playable game slice of the video game based on the defined boundaries, the playable game slice of the video game being a portion of the video game, the playable game slice being configured for interactive gameplay;
- sharing the playable game slice of the video game over the network via a social network to one or more additional client devices for interactive gameplay by one or more additional users;
- wherein the method is executed by a processor.

17. The method of claim 16, wherein the break point processor is configured to determine breakpoints that define the boundaries based on one or more of geography, time, task accomplishment, goal accomplishment, a physical scene boundary, or a temporal scene boundary.

18. The method of claim 16,
- wherein defining boundaries within a gameplay context of the video game includes defining a spatial boundary within a virtual space of the video game;
- wherein the spatial boundary within the virtual space of the video game defines a portion of the virtual space less than an entirety of the virtual space, the portion of the virtual space having a subset of features of the virtual space.

19. The method of claim 16, wherein defining boundaries within a gameplay context of the video game includes one or more of, defining a temporal boundary within a temporal context of the video game, or identifying a nearest start point or a nearest end point of one or more of a stage, level, or scene.

20. The method of claim 16, wherein at least one of said thresholds is associated to one or more of user inputs, a rate of user input, a frequency of user input, repeats of a user input, an input pattern, sharing of the gameplay context with other users, posting of comments associated with the gameplay on a social network, or popularity of portions of the video game based on social network sharing levels.

21. The method of claim 11, wherein the break point processor is configured to determine breakpoints that define the boundaries based on one or more of geography, time, task accomplishment, goal accomplishment, a physical scene boundary, or a temporal scene boundary.

* * * * *